United States Patent
Kakui et al.

(10) Patent No.: US 8,195,913 B2
(45) Date of Patent: *Jun. 5, 2012

(54) DATA STORAGE CONTROL ON STORAGE DEVICES

(75) Inventors: Kentaro Kakui, Odawara (JP); Kyosuke Achiwa, Yamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,300

(22) Filed: May 2, 2011

(65) Prior Publication Data

US 2011/0208924 A1 Aug. 25, 2011

Related U.S. Application Data

(63) Continuation of application No. 12/704,463, filed on Feb. 11, 2010, now Pat. No. 7,949,828, which is a continuation of application No. 11/528,284, filed on Sep. 28, 2006, now Pat. No. 7,680,984.

(30) Foreign Application Priority Data

Apr. 18, 2006 (JP) ................................ 2006-114933
Sep. 5, 2006 (JP) ................................ 2006-240031

(51) Int. Cl.
*G06F 12/00* (2006.01)
(52) U.S. Cl. .......................... 711/204; 711/114; 711/154
(58) Field of Classification Search .................. 711/114, 711/154, 204

See application file for complete search history.

(56) References Cited

U.S. PATENT DOCUMENTS

| 6,269,431 | B1 | 7/2001 | Dunham |
| 6,823,442 | B1 | 11/2004 | Cameron |
| 7,680,984 | B2 * | 3/2010 | Kakui et al. .................. 711/114 |
| 7,949,828 | B2 * | 5/2011 | Kakui et al. .................. 711/114 |
| 2002/0112113 | A1 * | 8/2002 | Karpoff et al. ..................... 711/4 |
| 2004/0068636 | A1 | 4/2004 | Jacobson et al. |
| 2004/0260861 | A1 | 12/2004 | Serizawa et al. |
| 2005/0091266 | A1 | 4/2005 | Hasegawa |
| 2005/0235132 | A1 * | 10/2005 | Karr et al. ...................... 711/203 |
| 2006/0059308 | A1 * | 3/2006 | Uratani et al. ................. 711/114 |
| 2006/0101204 | A1 | 5/2006 | Bao |
| 2006/0212719 | A1 | 9/2006 | Miyawaki et al. |
| 2006/0248297 | A1 | 11/2006 | Watanabe et al. |
| 2007/0233992 | A1 * | 10/2007 | Sato ............................. 711/170 |
| 2007/0239944 | A1 | 10/2007 | Rupanagunta et al. |

FOREIGN PATENT DOCUMENTS

| JP | 2004-127301 | 10/2003 |
| JP | 2005-128771 | 12/2003 |
| JP | 2005-011316 | 3/2004 |
| JP | 2005-011316 | 1/2005 |

* cited by examiner

*Primary Examiner* — Reba I Elmore
(74) *Attorney, Agent, or Firm* — Foley & Lardner LLP

(57) ABSTRACT

An object of the present invention is to improve the usage efficiency of a storage extent in a storage system using the Allocation on Use (AOU) technique. A controller in the storage system allocates a storage extent in an actual volume to an extent in a virtual volume accessed by a host computer, detects any decrease in necessity for maintaining that allocation, and cancels the allocation of the storage extent in the actual volume to the extent in the virtual volume based on the detection result.

18 Claims, 27 Drawing Sheets

| SERIAL NUMBER | CHANNEL NUMBER | LUN | VIRTUAL BIT | LDEV NUMBER |
|---|---|---|---|---|
| 0 | 1A-0 | 0 | OFF | 0001 |
| 1 | 1A-0 | 1 | ON | 0001# |
| 2 | 1B-0 | 0 | OFF | 0002 |
| | | | | |

FIG.5

| SERIAL NUMBER | VIRTUAL LDEV NUMBER | POOL NUMBER |
|---|---|---|
| 0 | 0001# | 01 |
| 1 | 0002# | 02 |
| | | |

FIG.6

| SERIAL NUMBER | LDEV NUMBER | USAGE REGISTER |
|---|---|---|
| 0 | 0001 | L |
| 1 | 0002 | L |
| 2 | 0003 | P |
| 3 | 0004 | P |
| 4 | 0005 | P |
| 5 | 0006 | N |
| | | |

FIG.7

| SERIAL NUMBER | POOL NUMBER | LDEV NUMBER LIST |
|---|---|---|
| 0 | 01 | 0003,0005 |
| 1 | 02 | 0004 |
| | | |

VIRTUAL LDEV NUMBER : 0001#

| SERIAL NUMBER | ADDRESS | POOL LDEV NUMBER | ACTUAL ADDRESS | ACCESS BIT |
|---|---|---|---|---|
| 0 | 0 | 0003 | 0 | 1 |
| 1 | 5 | 0003 | 1 | 1 |
| 2 | 6 | 0003 | 2 | 0 |
| 3 | 10 | 0005 | 0 | 1 |
| | | | | |

| SEGMENT NUMBER : 01 | | | |
|---|---|---|---|
| SERIAL NUMBER | DATA BLOCK NUMBER | ADDRESS | USAGE BIT |
| 0 | 01 | 0 | 1 |
| 1 | 02 | 1 | 0 |
| | | | |

DATA STORAGE CONTROL ON STORAGE DEVICES

CROSS-REFERENCES TO RELATED APPLICATIONS

This application is a Continuation of U.S. patent application Ser. No. 12/704,463, filed Feb. 11, 2010, which is a Continuation of U.S. patent application Ser. No. 11/528,284, filed Sep. 28, 2006, which claims priority from Japanese Patent Application Nos. 2006-114933, filed on Apr. 18, 2006, and 2006-240031, filed Sep. 5, 2006, and the entire disclosures of which are incorporated herein by reference in their entirety.

BACKGROUND OF THE INVENTION

The present invention relates to a storage system that performs data storage control on storage devices such as a hard disk drive (hereinafter referred to as a "HDD").

In accordance with the increase in the amount of data managed in a computer system including a storage system, and a server and host computer connected to the storage system via a communication path such as a network, the amount of the storage extents in the storage system has been increasing. In a storage system, a volume a host computer can access is logically defined, and the host computer can perform data input and output to/from a storage device by accessing a physical storage extent included in the logical volume.

Recently, because the data amount managed by a host computer has increased considerably, the volume size, being the storage capacity of a volume, has to be increased to a large extent. If a large-sized storage extent is allocated in advance to a host computer, shortage of storage capacity for the host computer does not occur, and therefore, the storage extent size allocated to the host computer does not have to be extended in the middle of processing. However, if a host computer does not use so much data, part of the storage extent allocated to the computer will remain unused, and that unused storage extent is wasted. Therefore, JP-A-2005-11316 proposes allocating an actual storage extent to an extent in a virtual volume in a storage system when a processor in a host computer writes data to that virtual volume. U.S. Pat. No. 6,823,442 discloses providing a storage system with a virtual volume that is to be accessed by a host computer and allocating a physical storage extent to that virtual volume.

Conventional examples concerning the present invention include JP-A-2005-128771, which relates to a data file system including a data access server with physical storage for storing data, that accesses the physical storage when receiving an access request; and a data file server that sends an access request to the data access server and performs data filing by using the data access server for data storage, and in which a physical block is effectively released when a logical block becomes unnecessary. JP-A-2004-127301 discloses a storage system including a virtual storage space, a physical storage space, a mapping system configured to associate a plurality of addresses in the virtual storage space with respective addresses in the physical storage space, and a controller configured to automatically remove a portion of the mapping system according to a priority specification for designating the portion to be removed of the mapping system according to the order.

SUMMARY OF THE INVENTION

The applicant of the present invention has developed a technique called "Allocation on Use (AOU)" to make effective use of storage resources in a storage system. In the AOU technique, a storage system provides a virtual volume that does not have a storage extent to a host computer, and a set of storage extents called a "pool" is linked to the virtual volume. When a host computer accesses a virtual volume, the storage system allocates a storage extent included in the pool to an extent in the virtual volume accessed by the host computer. The allocation is made when the host computer accesses the virtual volume. Because one pool can be linked to a plurality of virtual volumes, the storage system can effectively use the storage extents in the pool. The storage system prepares in advance a virtual volume having an apparent capacity and expands the storage capacity in the pool according to the usage state of the pool.

Because in the AOU technique a storage extent in a pool is allocated to an extent in a virtual volume, the storage extent allocated to the virtual volume just increases every time a host computer access the extent in the virtual volume. If it is determined that there will not be any substantial access from the host computer to the storage extent, the usage efficiency of the storage extent is reduced if the allocation of the storage extents to the virtual volume remains fixed. Moreover, because a storage extent is allocated to the virtual volume when the host computer accesses the virtual volume, there is still room for improvement in the throughput of the host computer accessing storage extents in the pool via the virtual volume.

Accordingly, an object of the present invention is to improve the usage efficiency of storage extents in a storage system that utilizes the AOU technique. Another object of the present invention is to improve the access speed of a host computer accessing a storage extent via a virtual volume in a storage system that utilizes the AOU technique. Still another object of the present invention is to improve the access speed of a host computer accessing a storage extent via a virtual volume, and also improve the usage efficiency in storage extents in a storage system that utilizes the AOU technique.

According to the present invention, a storage extent is allocated to a virtual volume, and, that allocation is cancelled at the occurrence of certain events. Accordingly, a storage system in which storage resources can be efficiently used can be provided. Examples of possible events include cancellation of the paired state of a volume pair, completion of data in a sub volume storing a snapshot of a main volume being backed up to an external medium; the performing of processing specified by a data delete command issued from a host computer to the storage system; and the performing of regular release processing on a storage extent that has been allocated in advance to a host computer but not accessed by a host computer.

According to the present invention, a storage system, which has a storage device and a controller that controls data input and output to/from the storage device in response to requests from a host computer connected to a storage system via a communication path, includes a virtual volume accessed by the host computer, and an actual volume including a storage extent in the storage device. The host computer accesses a storage extent in the actual volume via the virtual volume, as the actual volume is allocated to the virtual volume. The controller allocates a storage extent in the actual volume to an extent in the virtual volume accessed by the host computer in response to the access from the host computer to the virtual volume, and also detects any decrease in the necessity for maintaining that allocation, and cancels the allocation of the storage extent in the actual volume to the extent in the virtual volume based on the detection result.

Moreover, according to the present invention, a storage system, which has a storage device and a controller, that controls data input and output to/from the storage device in response to requests from a host computer connected to the storage system via a communication path, includes a virtual volume accessed by the host computer, and an actual volume including a storage extent in the storage device. The host computer accesses the storage extent of the actual volume via the virtual volume, as the actual volume is allocated to the virtual volume. The controller allocates a storage extent in the actual volume to an extent in the virtual volume accessed by the host computer in response to the access from the host computer to the virtual volume, predicts an extent in the virtual volume that will be subsequently accessed by the host computer, and allocates a storage extent in the actual volume to the predicted extent.

As described above, according to the present invention, a storage extent is allocated to the virtual volume, and that allocation is cancelled upon the occurrence of certain events, whereby a storage system that can efficiently use storage resources can be provided. Moreover, according to the present invention, the access speed of a host computer accessing a storage extent via a virtual volume can be improved in the storage system utilizing the AOU technique. Furthermore, in a storage system utilizing the AOU technique, the access speed of the host computer accessing a storage extent via a virtual volume can be improved, and the usage efficiency of storage extents can also be improved.

BRIEF DESCRIPTION OF THE DRAWINGS

FIG. 5 is a virtual LDEV management table.

FIG. 6 is a table showing a list of LDEVs a RAID control program provides to a channel controller and a host computer.

FIG. 7 is a pool management table.

DETAILED DESCRIPTION OF PREFERRED EMBODIMENTS

Figure 1:
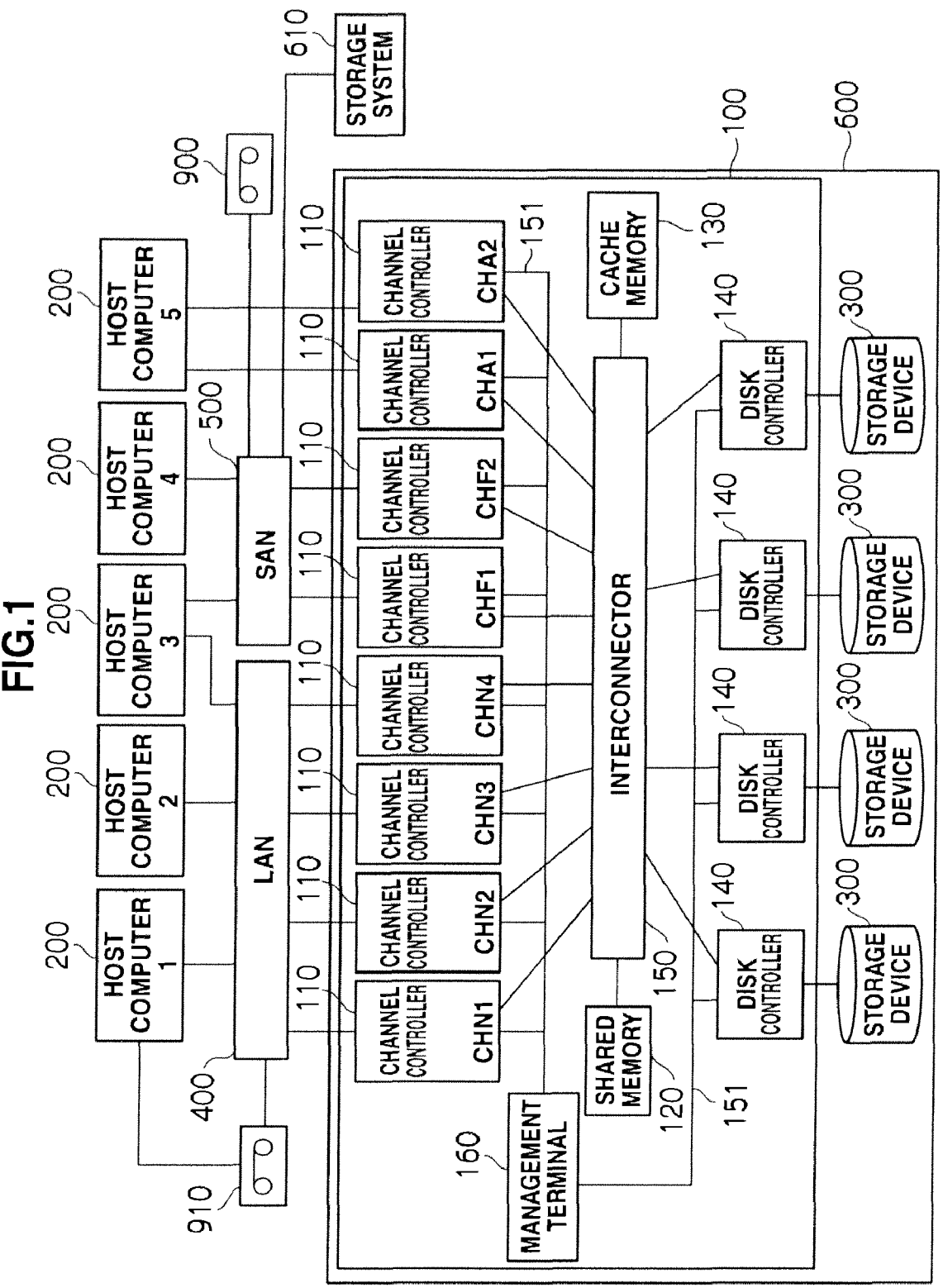
FIG. 1 is a hardware block diagram showing a storage control system including a storage system applying present invention.

Embodiments of the present invention will be described below with reference to the drawings. In the drawings explained below, one component is provided with one reference number, and repeated description of the same component will be omitted or simplified.

FIG. 1 is a hardware block diagram showing a storage control system including a storage system (also called "storage apparatus") 600 the present invention is applied in. The storage system 600 includes a plurality of storage devices 300 and a storage device controller 100 that controls input to/output from the storage devices 300 in response to an input/output request from a plurality of host computers 200.

The host computer 200 is a server (host) or a storage apparatus management computer having a Central Processing Unit (CPU) and memory, etc. For example, a workstation, mainframe computer, personal computer or something similar is used. The host computer 200 may also be configured by connecting a plurality of computers to a network. The host computer 200 has an application program that operates on an operating system. The application system may be a bank automated teller machine system or an aircraft seat reservation system or the like. The server may be a working server for executing the application, or a backup server for executing data backup in the back-end of the working server.

The host computers 1 to 3 (200) are connected, via a LAN (Local Area Network) 400, to the storage system 600. The LAN 400 is a communication network such as Ethernet (Registered Trademark) or a Fiber Distributed Data Interface (FDDI), and the host computers 1 to 3 (200) and the storage system 600 communicate mutually according to Transmission Control Protocol/Internet Protocol (TCP/IP) Protocol Suite. The host computers 1 to 3 (200) request data access to the storage system 600 by specifying a file name (data input/output request by files: hereinafter referred to as "file access request") to channel controllers CHN1 to CHN4 (110) described later.

A backup device 910 is connected to the LAN 400. The backup device 910 is a disk device, such as, Magneto-Optical (MO), Compact Disc Recordable (CD-R), Digital Versatile Disk Rewritable (DVD-RW), etc., or a tape device such as a Digital Audio Tape (DAT) tape, cassette tape, open tape, or cartridge tape, etc. The backup device 910 stores a backup of data stored in the storage devices 300 by communicating with the storage device controller 100 via the LAN 400. The backup device 910 is also connected to the host computer 1 (200) and acquires a backup of data stored in the storage devices 300 via the host computer 1 (200).

The storage device controller 100 includes the channel controllers CHN1 to CHN4 (110). The storage device controller 100 handles, via the channel controllers CHN1 to CHN4 (110) and the LAN 400, write access and read access between the host computers 1 to 3 (200), backup device 910, and storage device 300. The channel controllers CHN1 to CHN4 (110) each receive file access requests from the host computers 1 to 3 (200). In other words, each of the channel controllers CHN1 to CHN4 (110) has an assigned network address (for example, an IP address) on the LAN 400, and can act as separate NAS server and serve as a NAS server to the host computers 1 to 3 (200) as if independent NAS servers exist. Because the storage system 600 includes the channel controllers CHN1 to CHN4 (110) that separately serve as Network-attached Storage (NAS) servers, NAS servers that have conventionally been separate computers and managed separately are brought together in the single storage system 600. With this configuration, the storage system 600 can be managed collectively, and maintenance work including various settings, control and failure management, and version management, etc., is more efficient.

The host computers 3 and 4 (200) are connected, via a Storage Area Network (SAN) 500, to the storage device controller 100. The SAN 500 is a network for exchanging data between the host computers 3 and 4 and the storage system 600 in blocks, which are data management units in a storage extent provided by the storage devices 300. The communication between the host computers 3 and 4 (200) and the storage device controller 100 via the SAN 500 is generally performed according to Small Computer System Interface (SCSI) Protocol. The host computers 3 and 4 (200) request data access in blocks (hereinafter referred to as "block access request") according to Fibre Channel Protocol.

The SAN 500 is connected to a SAN-capable backup device 900. The SAN-capable backup device 900 stores a backup of data stored in the storage devices 300 by communicating with the storage device controller 100 via the SAN 500.

The storage device controller 100 includes not only the channel controllers CHN1 to CHN4 (110), but also channel controllers CHF1, CHF2, CHA1, and CHA2 (110). The storage device controller 100 communicates with the host computer 3 or 4 (200) and the SAN-capable backup device 900 via the channel controller CHF1 or CHF2 (110) and the SAN 500. The channel controllers process access commands from a host computer.

The host computer 5 (200) is connected to the storage device controller 100 via neither the LAN 400 nor SAN 500. An example of the host computer 5 (200) is a mainframe computer. Communication between the host computer 5 (200) and the storage device controller 100 is performed according to a communication protocol, such as FICON (Fibre Connection) (Registered Trademark), ESCON (Enterprise System Connection) (Registered Trademark), ACONARC (Advanced Connection Architecture) (Registered Trademark), or FIBARC (Fibre Connection Architecture) (Registered Trademark), etc. The host computer 5 (200) transmits a block access request to the storage system 600 according to such a communication protocol. The storage device controller 100 communicates with the host computer 5 (200) through the channel controller CHA1 or CHA2 (110).

The SAN 500 is connected to another storage system 610. The storage system 610 provides the host computers and the storage system 600 with the ability to provide storage resources the storage system 610 has to the storage device controller 100. The storage extent in the storage apparatus provided to the host computer is seemingly expanded by the storage system 610. In some cases the storage system 610 is connected to the storage system 600 via a communication line other than the SAN 500, such as an Asynchronous Transfer Mode (ATM) line. Alternatively, the storage system 610 can be directly connected to the storage system 600.

As described above, a storage system connectable to other various networks can be configured by having the storage system 600 include the channel controllers CHN1 to CHN4 (110), channel controllers CHF1 and CHF2 (110), and channel controllers CHA1 and CHA2 (110). In other words, the storage system 600 is a SAN-NAS integrated storage system that is connected to the LAN 400 via the channel controllers CHN1 to CHN4 (110), and to the SAN 500 via the channel controllers CHF1 and CHF2 (110).

The interconnector 150 mutually connects the respective channel controllers 110, shared memory 120, cache memory 130, and respective disk controllers 140. Command and data exchange between those channel controllers 110, shared memory 120, cache memory 130, and disk controllers 140 is performed via the interconnector 150. The interconnector 150 is a high-speed bus, such as a super high-speed crossbar switch, that performs data transmission with high-speed switching. With this configuration, communication performance between the respective channel controllers 110 is greatly improved, enabling high-speed file sharing and high-speed fail-over.

The shared memory 120 and cache memory 130 are memory devices shared by the channel controllers 110 and disk controllers 140. The shared memory 120 is used mainly for storing control information and commands, etc. The cache memory 130 is used mainly for storing data. For example, if a data input/output command received by a channel controller 110 from an host computer 200 is a write command, the relevant channel controller 110 writes the write command to the shared memory 120 and writes the write data received from the relevant host computer 200 to the cache memory 130. Meanwhile, the disk controllers 140 monitor the shared memory 120. If a disk controller 140 determines that a write command has been written to the shared memory 120, it reads the write data from the cache memory 130 and writes the data to the relevant storage device 300 according to the write command.

On the other hand, if a data input/output command received by a channel controller 110 from the host computer 200 is a read command, the relevant channel controller 110 writes the read command to the shared memory 120, and checks whether or not the data that is to be read exists in the cache memory 130. If that read data exists in the cache memory 130, the channel controller 110 reads that data from the cache memory 130 and transmits the data to the host computer 200. Meanwhile, if the read data does not exist in the cache memory 130, the disk controller 140 that has detected that a read command has been written to the shared memory 120 reads the read data from the storage device 300, writes that data to the cache memory 130, and writes to the shared memory 120 that the disk controller has written the data to the cache memory 130. When the channel controller 110, monitoring the shared memory 120, detects that the read data has been written to the cache memory 130, it reads that data from the cache memory 130 and transmits the data to the host computer 200.

Each disk controller 140 converts data access requests specifying a logical address transmitted from a channel controller 110 to a storage device 300 into data access requests specifying a physical address, and writes or reads data to/from the storage devices 300 in response to an Input/Output (I/O) request output from the channel controller 110. If the storage devices have a Redundant Array of Independent Disks (RAID) configuration, the disk controller 140 performs data access according to that RAID configuration. In other words, the disk controller controls Hard Disk Drives (HDDs), which are the storage devices, and RAID groups. A RAID group includes a plurality of HDD storage extents.

Each storage device 300 includes a single or plurality of disk drives (physical volumes), and provides storage extents accessible from the host computers 200. In the storage extents provided by the storage device 300, a logical volume formed by gathering memory space of a single or plurality of physical volumes is set. The logical volume set in the storage devices 300 may be a user logical volume accessible from the host computers 200 or a system logical volume used for controlling the channel controllers 110. The system logical volume stores an operating system executed in the channel controllers 110. A logical volume that can be accessed by each channel controller 110 is allocated to the logical volume the storage devices 300 provide to the host computer. Of course, a plurality of the channel controllers 110 may share a single logical volume.

The storage device 300 may be a hard disk device or similar. In the storage device 300, a RAID-type disk array can be configured with a plurality of storage devices 300. The storage devices 300 and the storage device controller 100 may be directly connected to each other, or may be connected via a network. Alternatively, the storage devices 300 may be integrated with the storage device controller 100.

The management terminal 160 is a computer device for maintaining and managing the storage system 600, and is connected to the respective channel controllers 110 and disk controllers 140 via an internal LAN 151. By operating the management terminal 160, an operator can configure settings in the disk drives in the storage devices 300 and settings in the logical volume, and install a microprogram executed in the channel controllers 110 and disk controllers 140. The above control may be performed from a management terminal, or may be performed, via a network, with a program that operates on a host computer.

Figure 2:
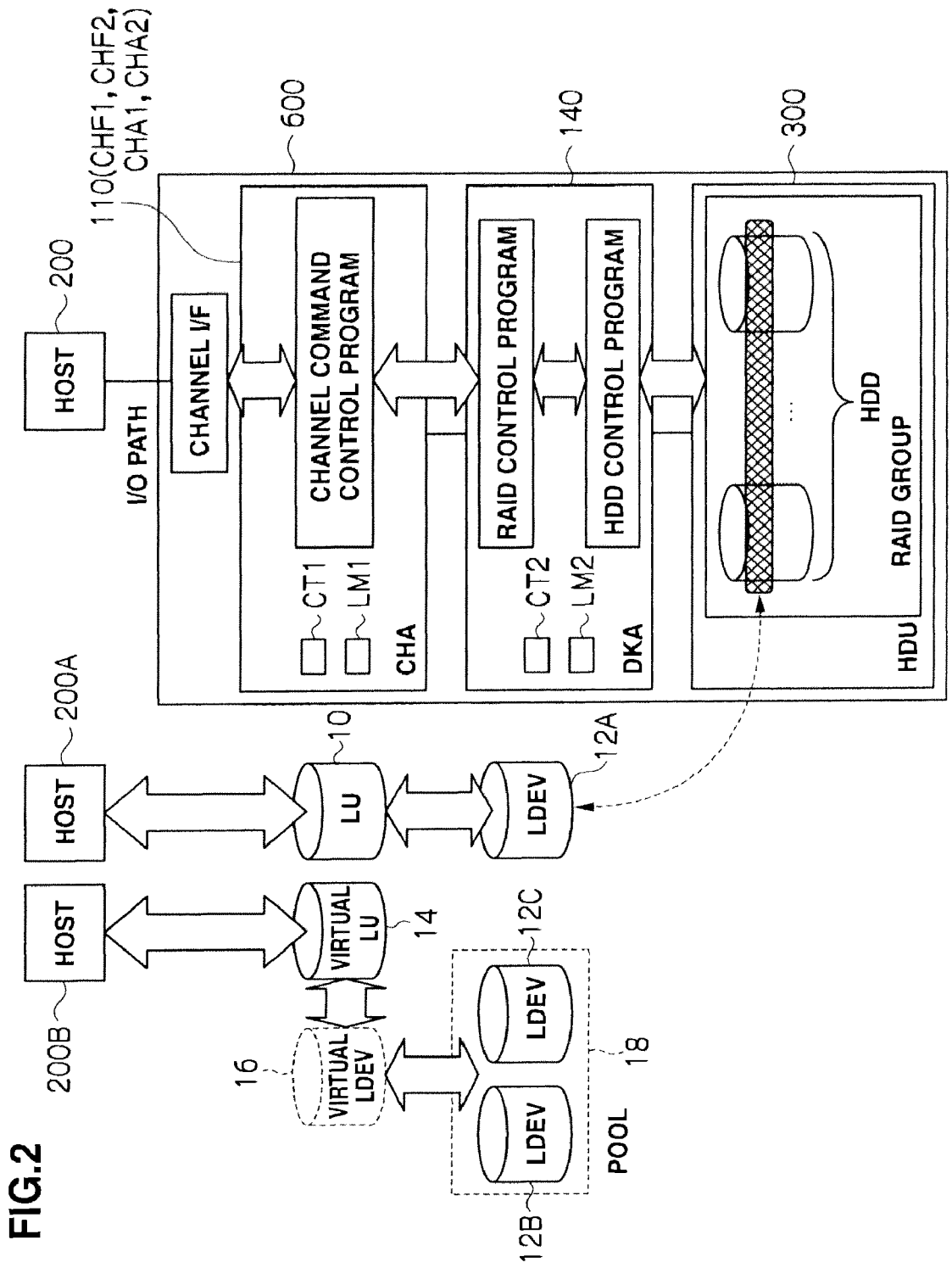
FIG. 2 is a functional block diagram of the storage control system shown in FIG. 1.

FIG. 2 is a functional block diagram of the storage control system shown in FIG. 1. Each channel controller 110 includes a microprocessor CT1 and local memory LM1. A channel command control program is stored in the local memory LM1. The microprocessor CT1 executes the channel command control program by referring to the local memory LM1. The channel command control program provides Logical Units (LUs) to a host computer. The channel command control program processes an access command transmitted from a host computer to an LU and converts that access into an access to a Logical Device (LDEV). In some cases the channel command control program accesses an LDEV even when a host computer does not access the LDEV. The "LDEV" is a logical volume formed by logically dividing up part of a RAID group. However, though a virtual LDEV is accessed by a host computer, it does not have an actual storage extent. A host computer actually accesses an LU, not an LDEV. The "LU" is a unit of the storage extent accessed by a host computer. Some of LUs are allocated to virtual LDEVs. The LU allocated to the virtual LDEV is hereinafter referred to as a "virtual LU," for convenience, to distinguish it from the LU allocated to an actual volume.

Each disk controller 140 includes a microprocessor CT2 and local memory LM2. The local memory LM 2 stores a RAID control program and HDD control program. The microprocessor CT2 executes the RAID control program and HDD control program by referring to the local memory LM2. The RAID control program configures a RAID group with a plurality of the HDDs and provides LDEVs for the channel command control program, which is a higher-layer program. The HDD control program executes data read and write from/to the HDDs in response to requests from the RAID control program, which is a higher-layer program. The host computer 200A accesses an LDEV 12A via the LU 10. The storage extent provided for the host computer 200B is configured with the AOU function. The host computer 200B accesses a virtual LDEV 16 via a virtual LU 14. A pool 18 is allocated to the virtual LDEV 16, and LDEVs 12B and 12C are allocated to the pool 18. A virtual LU and virtual LDEV are equivalent to a virtual volume. The "pool" is a group of LDEVs allocated to the virtual LDEV. Channel interface (I/F) and I/O paths are interfaces, such as Fibre Channel or Internet Small Computer System Interface (iSCSI) interfaces, for a host computer to access a storage subsystem.

Figures 3, 4:
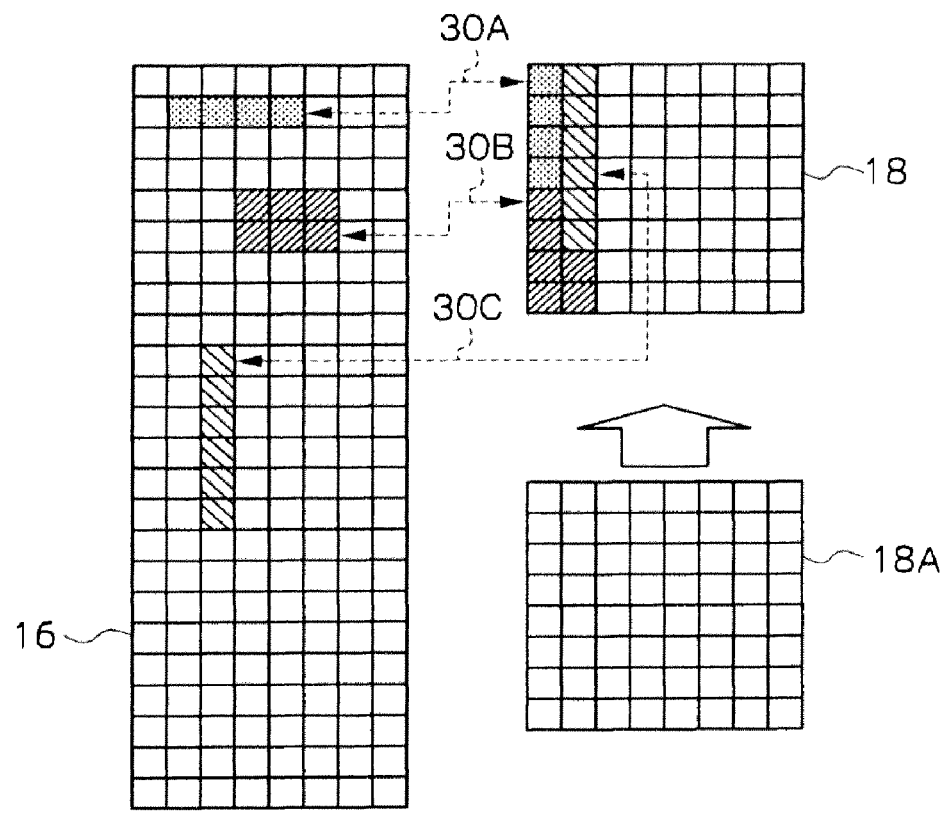
FIG. 3 is a block diagram showing the relationship between a virtual volume and a pool.
FIG. 4 is an LU management table.

FIG. 3 is a block diagram showing the relationship between the virtual volume and the pool. A host computer accesses the virtual LDEV 16. The accessed extent in the virtual volume is mapped to the pool (physical storage device) 18. The dynamic mapping is performed in response to an access from the host computer to the virtual volume, and the storage system utilizes mapping information after the mapping is established. In the extents in the virtual volume, an unused extent does not consume a physical storage device. Therefore, by preparing a sufficiently large virtual volume in advance, the pool LDEVs can be allocated to the virtual volume in stages, according the state of the pool 18.

When each channel controller 110 executes the AOU processing according to the channel command control program, several management tables are used, each of which will be described below. FIG. 4 is an LU management table that maintains a list of LUs. Each LU is specified by combination of a channel number and LUN. If a virtual bit is OFF, the relevant LU is mapped to an LDEV provided by the RAID control program. If a virtual bit is ON, an LU is mapped to a virtual LDEV.

FIG. 5 is a virtual LDEV management table that maintains a list of virtual LDEVs. A virtual LDEV is specified by a virtual LDEV number. The management system for the virtual LDEV number is different from the management system for the LDEV number given to the LDEVs provided by the RAID control program. The pool number is used to specify the pool that is the mapping target for a virtual LDEV.

FIG. 6 shows a list of the LDEVs provided for the channel controllers and a host computer. Each LDEV is specified by the LDEV number. If the usage register entry is "L," the relevant LDEV is mapped to an LU. If the usage register entry is "P," the relevant LDEV is included in a pool, i.e. the LDEV belongs to a pool. If the usage register is "N," the relevant LDEV is not in use.

Figures 8, 9:
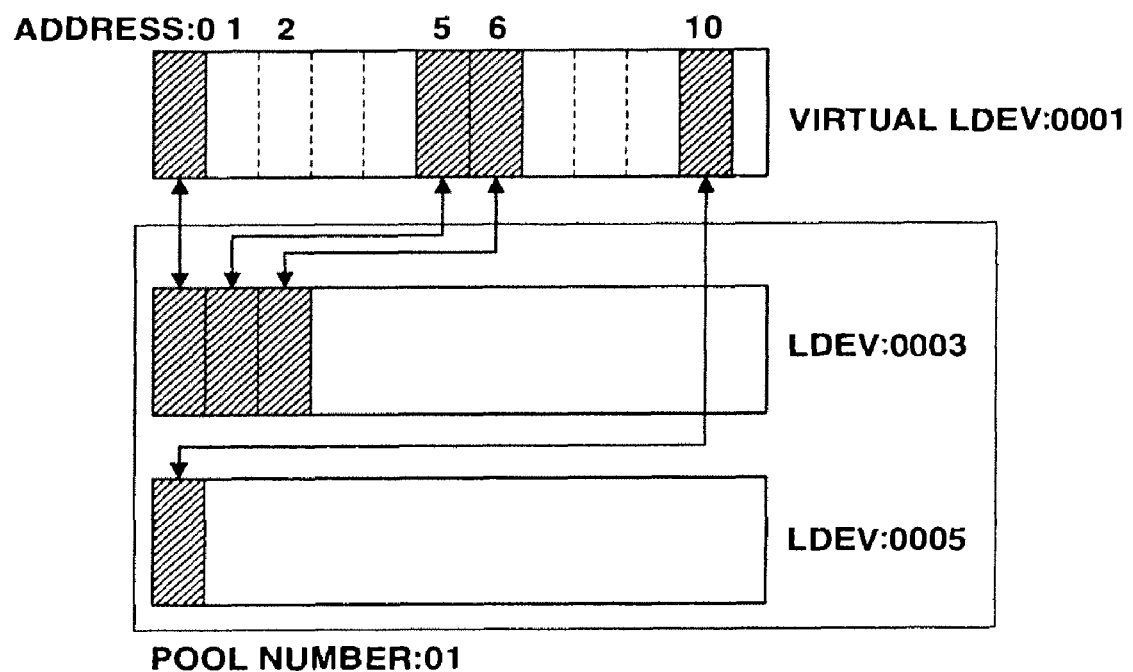
FIG. 8 is a mapping management table.
FIG. 9 is a block diagram showing the relationship between addresses in a virtual LDEV and actual storage extents in LDEVs belonging to a pool shown in the control table in FIG. 8.

FIG. 7 is a pool management table showing a list of pools. Each pool is specified by a pool number. An LDEV number list shows the LDEVs included in each pool (pool LDEVs). FIG. 8 is a mapping management table that maintains the mapping state between storage extents in the virtual LDEV and the corresponding storage extents in the relevant pool LDEV. A mapping management table exists for each virtual LDEV. In the example shown in FIG. 8, the virtual LDEV number is 0001#. Addresses, being extents in the virtual LDEV, and corresponding addresses (actual addresses) in the pool LDEVs are stored in this table.

The "addresses" mentioned above are the respective serial numbers given to each portion of the virtual LDEV and pool LDEV partitioned with a fixed size, and any kind of address may be used as long as the correspondence relationship between the virtual LDEV and the pool LDEVs used by that virtual LDEV can be understood. The addressing system may be to the same as, or different from, that used by a host computer when accessing an LU.

FIG. 9 is a graph showing the correspondence relationship between the addresses in the virtual LDEV and the actual storage extents in the LDEVs included in the pool shown in the control table in FIG. 8. The "1" access bit indicates that the mapping between an extent in the virtual LDEV and a storage extent in the pool LDEV has been made based on an access command issued from a host computer to a virtual LDEV; in other words, the virtual storage extent in the virtual LDEV has been linked to the actual storage extent in the pool LDEV because a host computer accessed a virtual LU. The "0" access bit indicates that the mapping has been made for some reason: for example, because allocation has been established by predicting a future access from a host computer. Those details will be described later.

Figure 10:
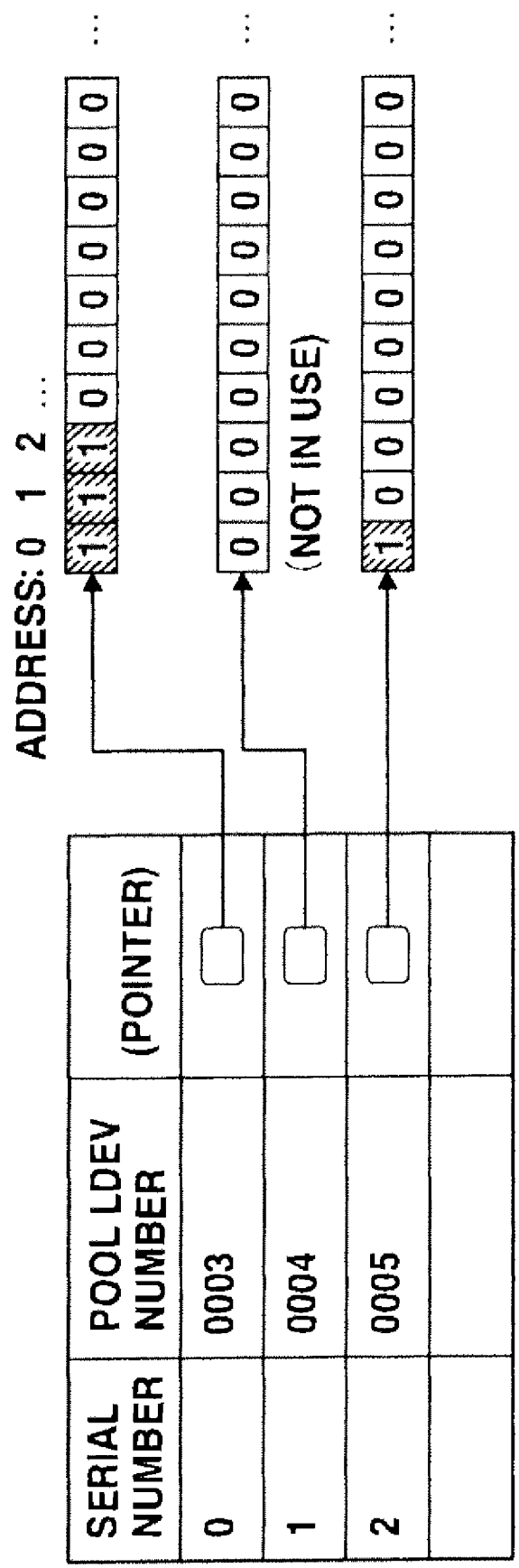
FIG. 10 is a pool LDEV management table showing the state where storage extents in a pool LDEV are mapped to extents in a virtual LDEV.

FIG. 10 is a pool LDEV management table relating to the state where storage extents in the pool LDEV are mapped to extents in the virtual LDEV. The mapping state in each pool LDEV is maintained as a control bit array (control information) set for each address in each pool LDEV. The pool LDEV management table stores pointers linked to bit arrays. The head of the bit array is set to "address 0," and the subsequent bits are set in the order of their addresses. The "0" bit indicates that the relevant storage extent has not been mapped to the virtual LDEV, and the "1" bit indicates that the relevant storage extent has already been mapped to the virtual LDEV. Referring to FIG. 10, in the LDEV with the pool LDEV number "0003," the extents with the addresses 0, 1, and 2 are mapped to the virtual LDEV. In the LDEV with the pool LDEV number "0004," no extent is mapped to the virtual LDEV. The extents with the address "0" in the LDEV with the pool LDEV number "0005" are mapped to the virtual LDEV.

The above described control tables are maintained in memory space that can be accessed by a channel command control program in the channel controller. The content in the control tables can be changed through the management terminal shown in FIG. 1. The memory space may be the shared memory 120 shown in FIG. 1, or the local memory LM1 in FIG. 2.

Figure 11:
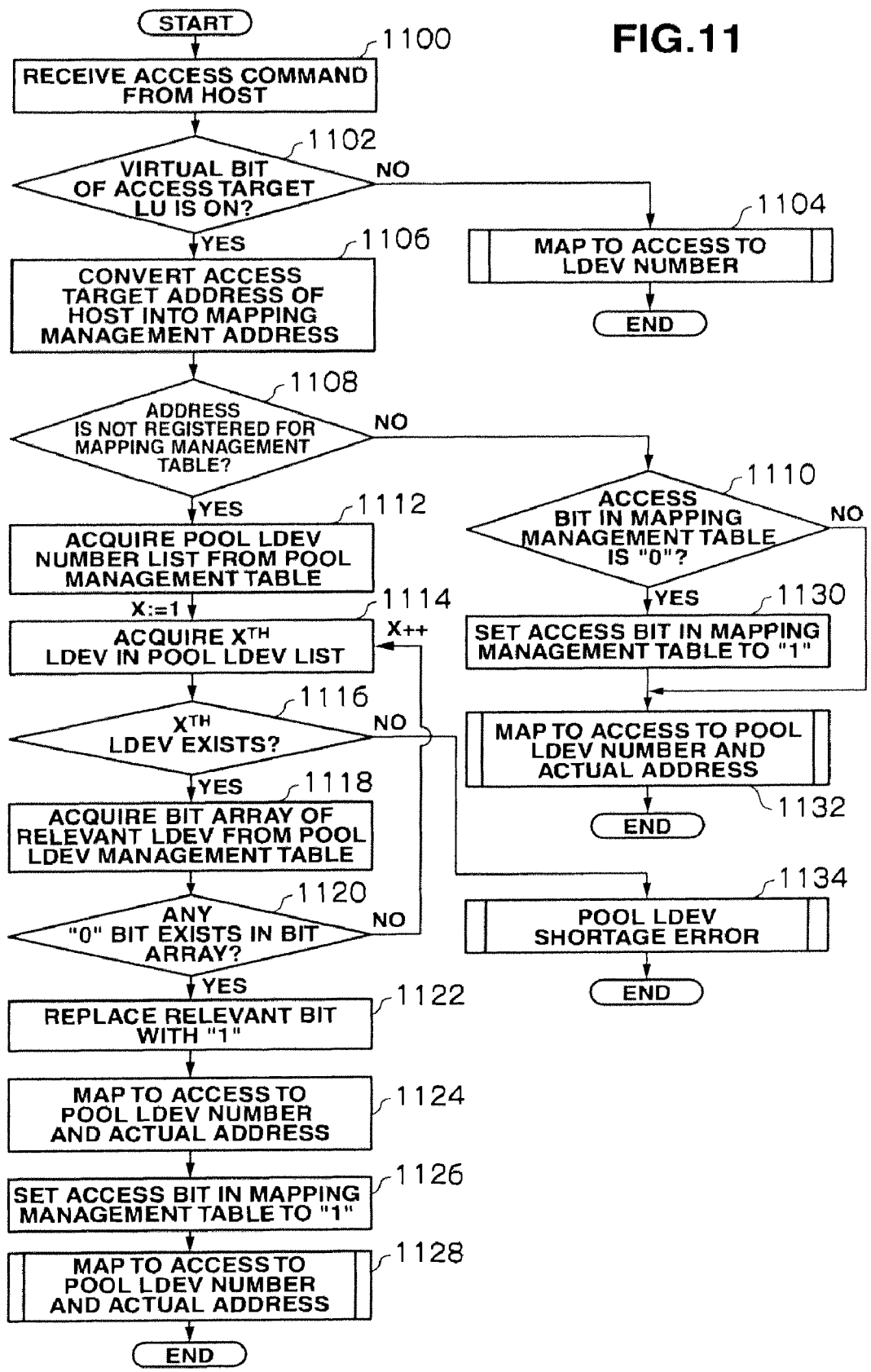
FIG. 11 is a flowchart showing an AOU processing operation in a storage system.

FIG. 11 is a flowchart illustrating the AOU operation according to the channel command control program performed when a host computer accesses an LU. The channel controller executes the AOU processing shown in FIG. 11 according to the channel command control program. The channel controller, receiving an access command from a host computer to an LU (1100), checks whether or not the virtual bit of the access target LU is ON (1102). If the virtual bit is OFF, the processing goes on to step 1104 and the access from the host computer to the LU is mapped to the actual volume (LDEV) (the LDEV numbers 0001 and 0002 in FIG. 4).

If the virtual bit is ON in step 1102, the address in the LU that is the host computer's access designation is converted into a mapping management address in the virtual LDEV (1106). Subsequently, the controller CT1 in the channel controller checks whether or not the above converted address is still unregistered for the mapping management table in FIG. 8 (1108). If the address is not yet registered for the mapping management table, the channel controller acquires a list of the LDEV numbers belonging to the pool corresponding to the virtual LDEV from the pool management table (1112). The channel controller obtains the $X^{th}$ LDEV (X:=1 . . . ) in the pool LDEV list (1114). The channel controller checks whether or not the $X^{th}$ LDEV exists (1116).

If the $X^{th}$ LDEV exists, the channel controller acquires the bit array for the LDEV from the pool LDEV management table (FIG. 10) (1118). The channel controller checks whether or not any "0" bit exists in the acquired bit array (1120). If any "0" bit exists, the channel controller sets that bit to "1" (1122). If no "0" bit exists the channel controller acquires the LDEV of the subsequent number (X++) in the pool LDEV list. In step 1124, the address corresponding to the bit set to "1" is registered, as an actual address, for the mapping management table (FIG. 8). Subsequently, the channel controller sets the access bit in the mapping management table to "1" (1126). After that, the channel controller maps the access from the host computer to the virtual volume (0001#) to an access to the relevant pool LDEV number and actual address (1128).

If the check result in step 1108 is NO, the channel adapter checks in step 1110 whether or not the access bit in the mapping management table in FIG. 8 is "0". If the check result is YES, the access bit is set to "1" (1130), and the channel controller maps the access from the host computer to the virtual volume (0001#) to an access to the relevant pool LDEV number and actual address (1132). If the $X^{th}$ LDEV does not exist in step 1116, the channel controller notifies the management terminal of a pool LDEV shortage error. According to the processing in FIG. 11, when the host computer accesses the virtual volume, the channel controller maps the accessed extent to an address in the actual storage extent.

Figure 12:
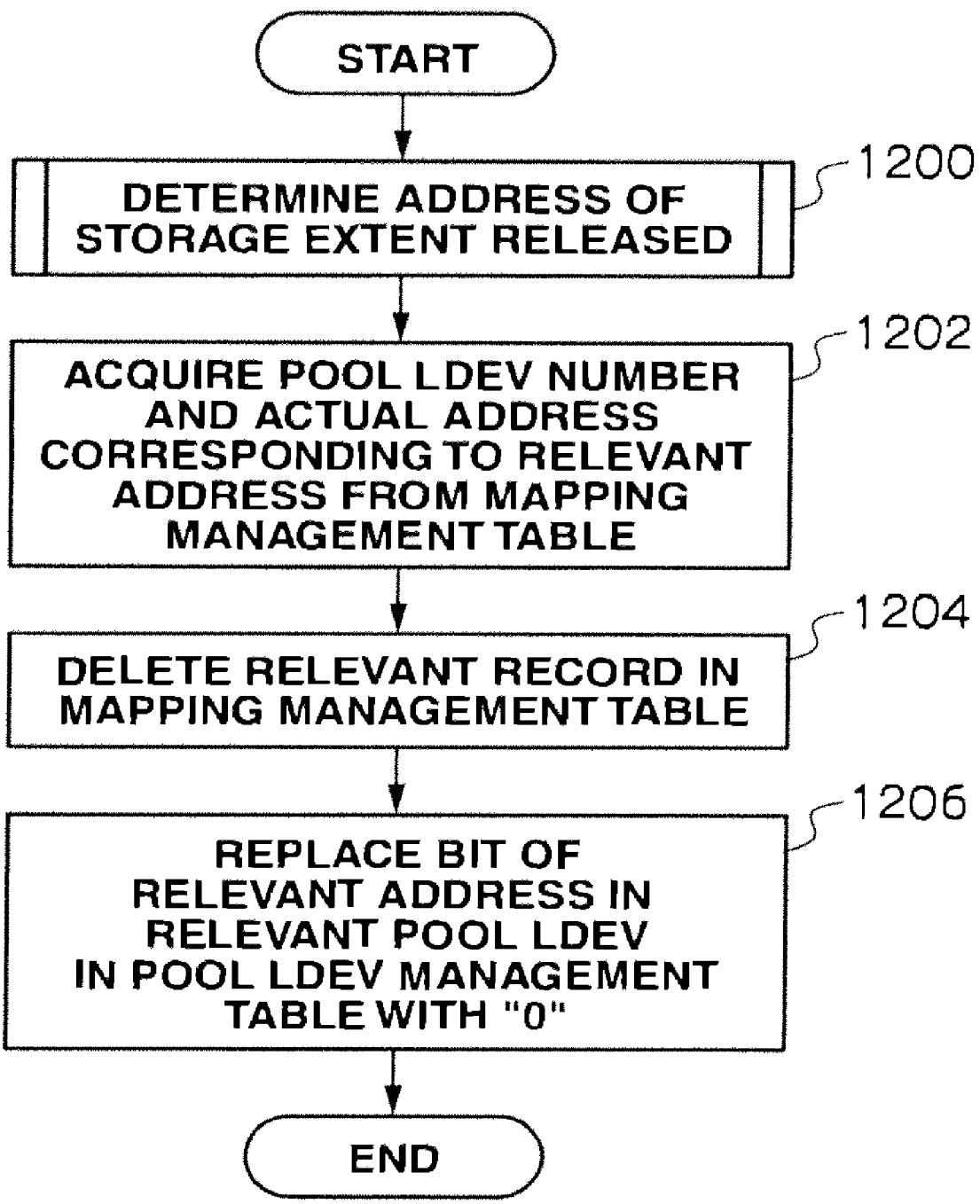
FIG. 12 is a flowchart executed by a channel controller according to a channel command control program.

FIG. 12 is a flowchart showing processing executed by the channel controller according to the channel command control program for releasing a storage extent in the pool LDEV from the mapping to the virtual volume by deleting the record used for mapping that storage extent in the pool LDEV to a storage extent in the virtual volume from the mapping management table and making the released storage extent available to another virtual volume, thereby using the storage extents effectively. First, the channel controller determines the release target address of the storage extent in the virtual volume.

After the address in the virtual volume is determined, the channel controller acquires the pool LDEV number and actual address relevant to the address in the virtual volume from the mapping management table (FIG. 8) (1202). Subsequently, the channel controller deletes the record concerning the mapping between the address in the virtual volume and the relevant LDEV number and actual address from the mapping management table (1204). After that, the channel adapter replaces, with "0," the bit of the address in the pool LDEV corresponding to the address in the virtual LDEV stored in the entries for the relevant pool LDEV in the pool LDEV management table (FIG. 10) (1206). The actual storage extent in the pool LDEV is thereby released from the mapping.

Figure 13:
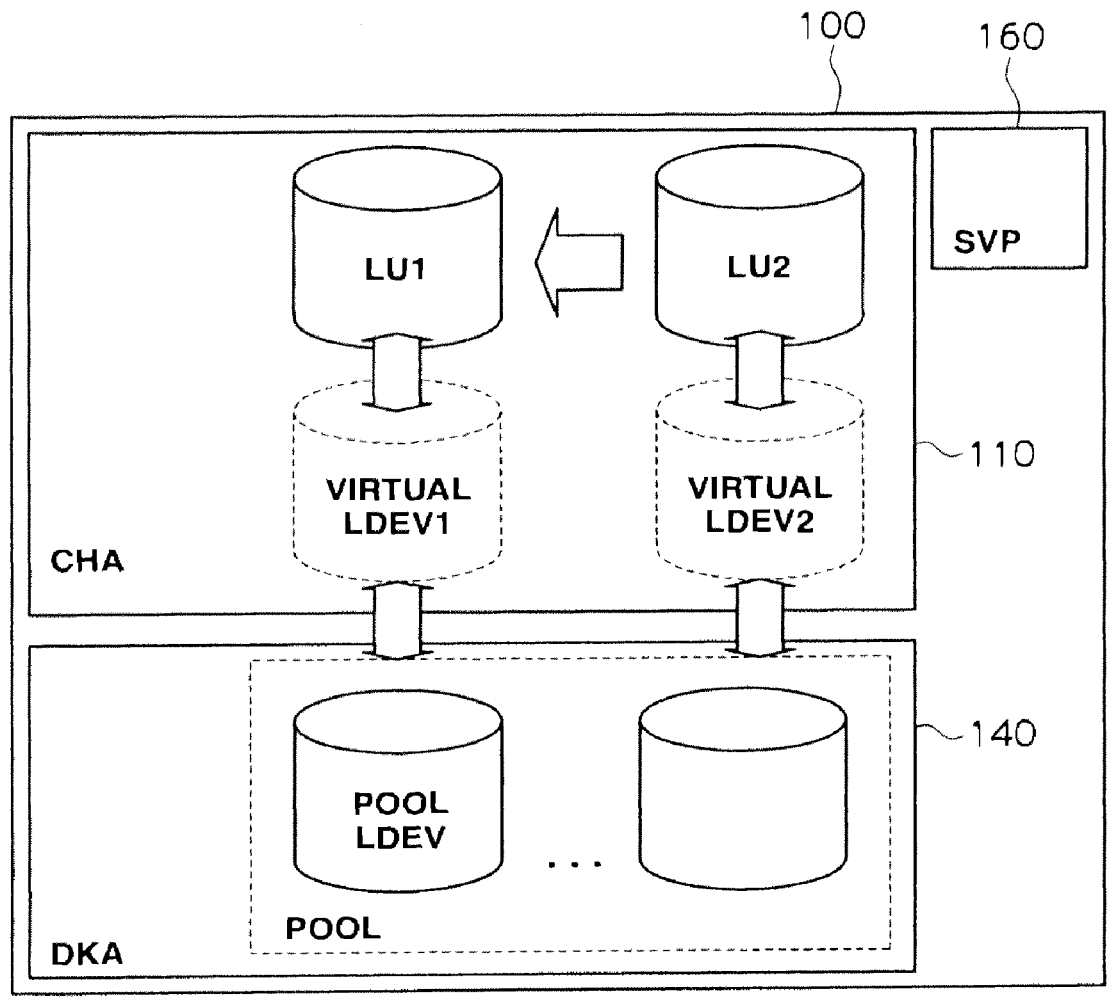
FIG. 13 is a block diagram illustrating a volume pair.

Next, the first example of a release trigger will be described. The release trigger in the first example is the cancellation of a volume pair. FIG. 13 is a block diagram illustrating a volume pair. In FIG. 13, a volume pair is formed between LU1 and LU2 for the purpose of backup, etc. LU1 is a sub volume and LU2 is a main volume. A host computer accesses LU2. The channel controller 110 regularly copies data in the main volume LU2 (copy source) and produces, in LU1, a snapshot of the volume content of LU2. The sub volume LU1 is associated with a virtual LDEV 1, and the virtual LDEV 1 is mapped to pool LDEVs in a pool. Data in the pool LDEV linked to the sub volume is backed up to an external medium, such as a tape device. If the pair relationship between the main and sub volumes is cancelled, the data content of the copy destination volume (sub volume) LU1 becomes unnecessary. In that case, if the sub volume is mapped to the virtual LDEV, the mapping between storage extents in the virtual LDEV and pool LDEV is cancelled and the storage extent in the pool LDEV is released from the unmapped virtual volume.

Figure 14:
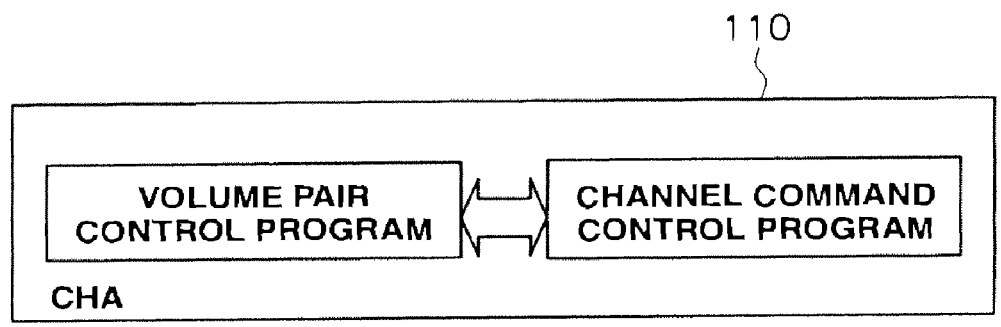
FIG. 14 is a block diagram showing the relationship between a volume pair control program and a channel command control program in a channel controller.

FIG. 14 is a block diagram showing the relationship between the volume pair control program and channel command control program in the channel controller 110. The volume pair control program issues a command to the channel command control program to control copies between LUs. The channel controller controls the settings, cancellation, and status change, etc. in a paired volume, according to a command from the management terminal. Those operations may also be performed according to a command issued by a host computer via a channel I/F. The channel controller releases a storage extent in a pool extent (actual volume) when receiving a paired volume cancellation notice sent from the volume pair control program.

Figure 15:
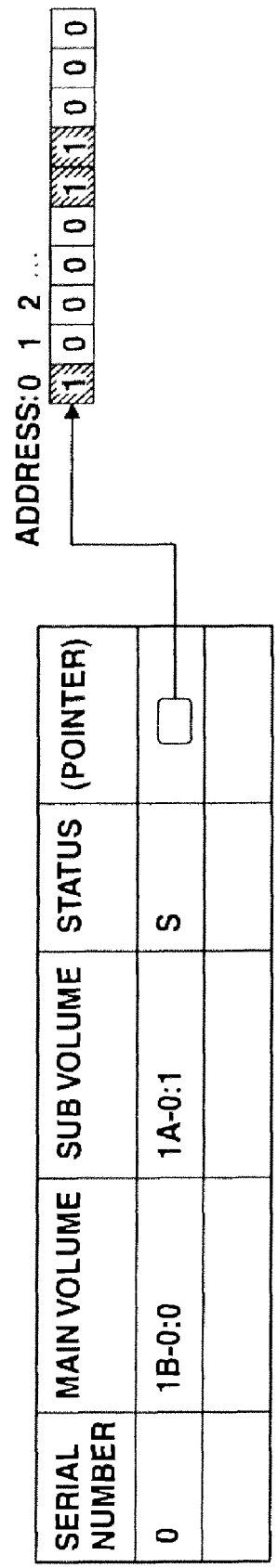
FIG. 15 is a volume pair management table.

FIG. 15 is a volume pair management table. Combinations of the channel number and LUN of paired main and sub volumes are maintained in the table. The volume pair control program produces a record concerning paired volumes when the pair relationship is established, and deletes that record when that pair relationship is cancelled. If the status is "P," the relevant volume pair is in the "pair state." If the status is "S," the relevant volume pair is in the "suspension state." If the status is "C," the relevant volume pair is in the "copy state." The pair state (P) means that if the main volume content is updated, the updated content is promptly copied to the sub volume, and therefore, the main volume content coincides with the sub volume content. The suspension state (S) means that the above described updating copy processing is not active. The copy state (C) means that the relevant volumes are in the middle of the state shift from the suspension state to the pair state, and the difference in the contents between the main and sub volumes is now being copied. The matched state in the volume content of each volume pair is maintained in the bit array, and pointers linked to each bit array are maintained in the volume pair management table. The head address of the bit array is set to "address 0," and the subsequent bits are set in the order of their addresses. The "1" bit indicates that the volume content in the storage extents corresponding to the relevant address is consistent, and the "0" bit indicates that the volume content in those extents is not consistent. This table is maintained in memory space that can be accessed by the programs in the channel controller.

Figure 16:
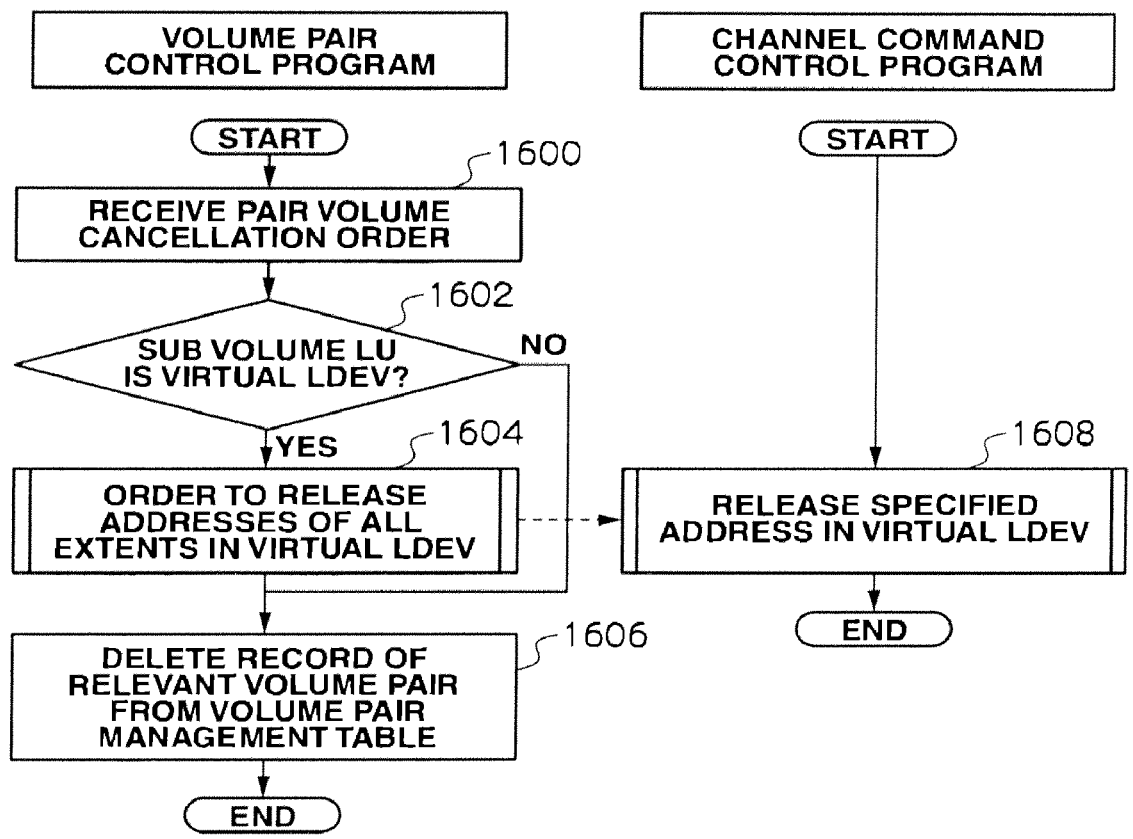
FIG. 16 is a flowchart showing release processing in response to pair cancellation of paired volumes.

FIG. 16 shows flowcharts illustrating the release processing in response to volume pair cancellation. The channel controller executes the processing shown in FIG. 16 according to the volume pair control program and channel command control program. The channel controller receives a cancellation command to cancel the pair state between paired volumes from a host computer (1600). The channel controller checks whether or not the sub volume LU is mapped to a virtual LDEV (1602). If the check result is YES, the volume pair control program orders the channel command control program to release addresses of all extents in the virtual LDEV from the mapping (1604).

After that, the record of the relevant volume pair is deleted from the volume pair management table (FIG. 15) (1606). The channel command control program, receiving the release order from the volume pair control program, cancels the mapping of the specified address in the virtual LDEV. Accordingly, usage efficiency of storage extents is improved by cancelling the mapping of the storage extent.

Figure 17:
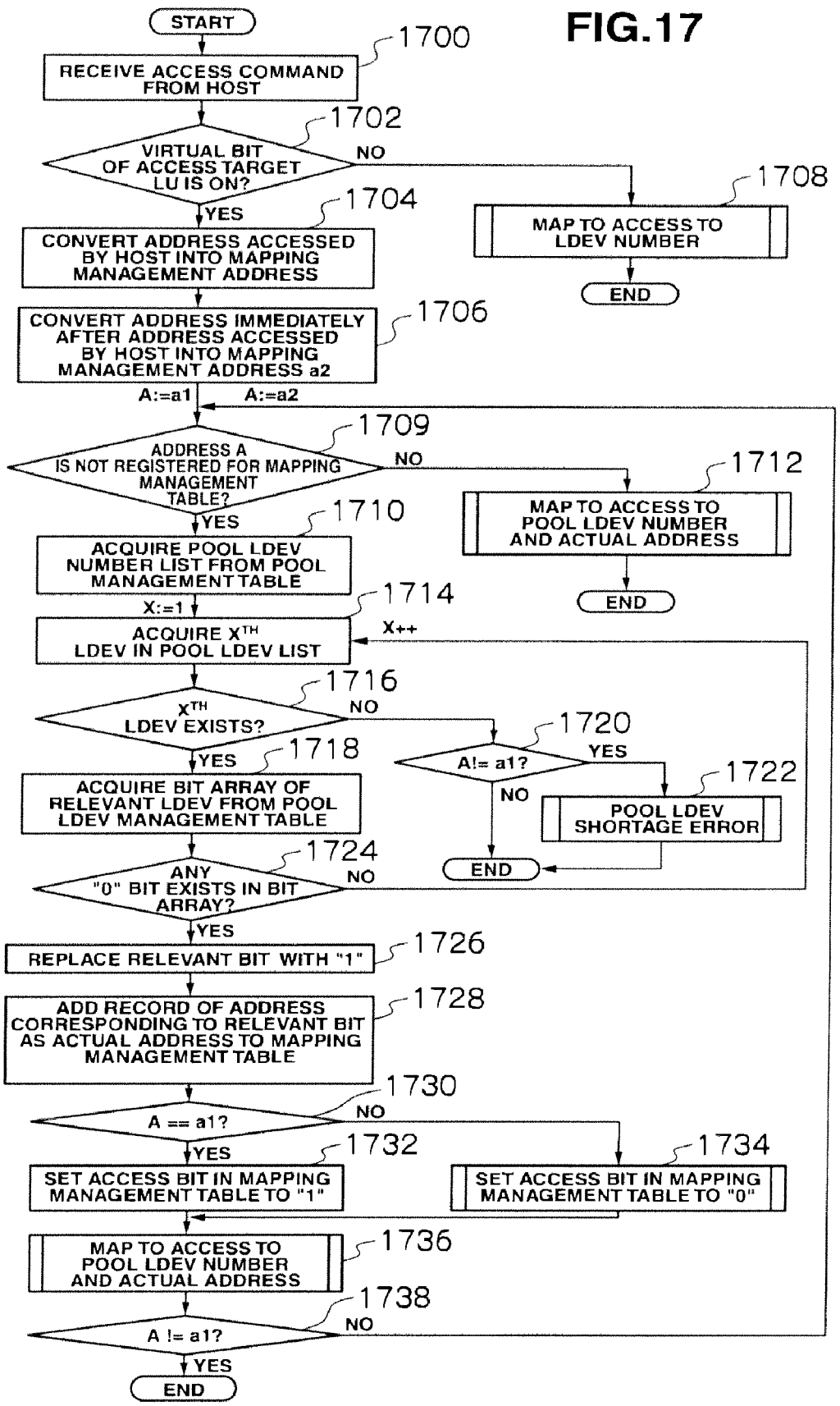
FIG. 17 is a flowchart illustrating a "speculative allocation."

Next, another embodiment of the release processing will be described. FIG. 17 is a flowchart illustrating "speculative allocation," in which, in the AOU technique, the storage system maps in advance storage extents in a pool LDEV to extents in the virtual volume that has not yet been accessed by a host computer. When the channel controller establishes mapping between the virtual LDEV and pool LDEV in response to an access command received from a host computer, because another address will be also accessed subsequent to the access target address specified in the above access command, mapping is established on a storage extent to which the subsequent access is expected to be made, such as an address immediately after the address accessed by the host computer (regardless of whether or not the host computer subsequently accesses the predicted address). That operation is performed generally based on the expectation that accesses from a host computer concentrate on a specific zone in an LU. However, the prediction of extent to which the subsequent access is made may vary depending on the pattern of the accesses from the host computer to the virtual device. In the above explanation of the speculative allocation example, the address that would be subsequently accessed is any of some addresses subsequent to the address specified in the access command, particularly the address immediately after the specified address. However, another way of "predicting" may also be available: for example, in a certain type of file system an LU is divided up into units called "cylinder groups," and it can be predicted that allocation is performed mainly on addresses (even if these addresses are non-contiguous) in the cylinder group that an address accessed by a host computer belongs to. If a host computer, does not access the above predicted extents, the allocation of those extents to the virtual volume is cancelled, enabling the storage extents to be used efficiently.

Referring to FIG. 17, the channel controller, receiving an access command from the host computer (1700), checks whether or not the virtual volume has been allocated to the access target LU, i.e. the virtual bit is "ON" (1702). If the result is NO, the channel controller determines that the host computer accesses an actual volume, and maps the access from the host computer to an access to the LDEV of the relevant LDEV number based on the mapping management table (1708). Meanwhile, if the check result in the step 1702 is YES, the access target address in the LU accessed by the host computer is converted into a virtual volume address (a1) for mapping management (1704). An address immediately after the access target address in the LU accessed by the host computer is also converted into a virtual volume address (a2) (1706).

Subsequently, the channel controller checks whether or not the address A (a1 or a2) is still unregistered for the mapping management table (FIG. 8) (1709). If the result is NO, i.e. the address a1 is registered, the channel controller maps the address a1 to the LDEV and actual address specified by the relevant LDEV number based on the mapping management table (1712). If the check result in step 1709 is YES, the channel controller acquires a pool LDEV number list from the pool management table (FIG. 7) (1710). The channel controller acquires the $X^{th}$ (first) LDEV in the pool LDEV list (1714), and checks whether or not the $X^{th}$ LDEV exits (1716). If the result is YES, the channel controller acquires the bit array of the relevant LDEV from the pool LDEV management table (1718). Subsequently, the channel controller checks whether or not the "0" bit exists in the acquired bit array (1724).

If the check result is NO, the processing goes back to step 1714 and the channel controller acquires the $(X+1)^{th}$ LDEV. Meanwhile, if the check result is YES, the "0" bit is replaced with the "1" bit (1726). After that, the channel controller registers the address corresponding to that bit as an actual address for the mapping management table (FIG. 8) (1728). In step 1730, whether or not the address A in the virtual volume is a1 is checked. If the check result is YES, the channel controller sets the access bit in the mapping management table (FIG. 8) to "1" (1732). Meanwhile, if the check result is NO, the channel controller sets the access bit to "0" (1734). As described above, the "0" access bit indicates that the mapping has not been established based on the access from the host computer to the virtual volume, i.e. the mapping has been made for the "speculative allocation."

Subsequently, the channel adapter maps the access from the host computer to the virtual volume to an access to the relevant pool LDEV number and actual address. If in step 1738 the address accessed by the host computer is a1, the above described allocation processing is repeated for the address a2. In other words, the processing goes back to step 1709 and the above described processing is repeated. If the $X^{th}$ LDEV does not exist in step 1716, the processing goes on to step 1720. In that step, whether or not the access target address of the host computer is the address a1 is determined. If the access target address is a1, the channel controller determines a pool LDEV shortage error (1722). Meanwhile, if the access target address is a2, the LDEV shortage error processing is not performed and the processing ends because the host computer does not actually access that address.

According to the above described processing, when the host computer access the virtual volume, a storage extent belonging to the pool is allocated to the access target address of the host computer, and the channel controller predicts the address in the virtual volume that would be subsequently accessed by the host and maps in advance a storage extent to the above predicted address. Accordingly, if the host computer actually accesses the predicted address afterward, a write command can be promptly executed in the mapped storage extent.

Figure 18:
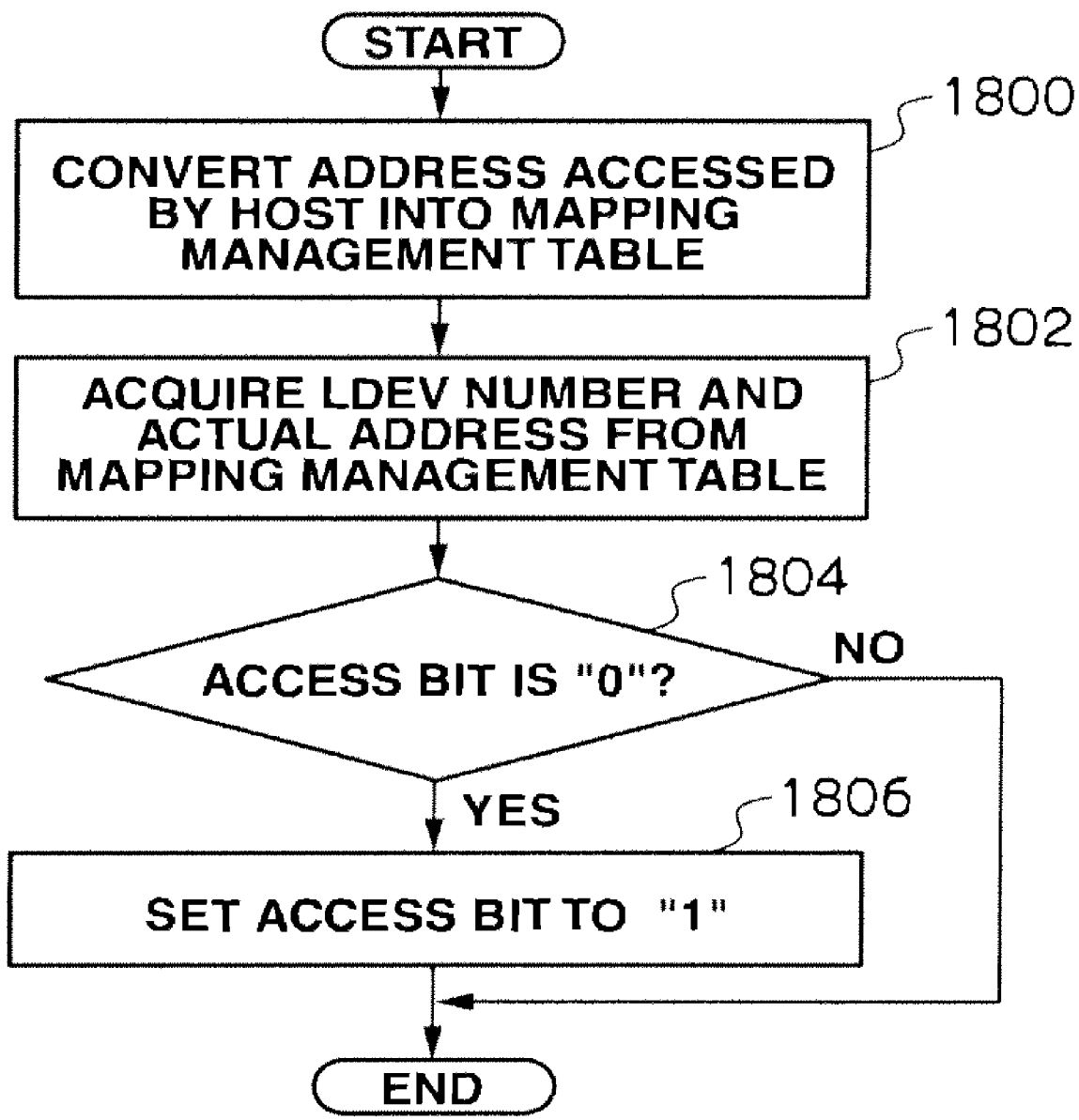
FIG. 18 is a flowchart illustrating processing operations concerning an access bit.

As shown in the flowchart in FIG. 18, if the host computer accesses a storage extent with the "0" access bit, that access bit is changed to "1." The channel controller converts the access target address of the host computer into an address for mapping management (1800). The channel controller acquires the relevant LDEV number and actual address from the mapping management table (1802). The channel controller checks whether or not the access bit stored in the control table shown in FIG. 8 is "0" (1804). If the check result is YES, the access bit is set to "1" (1806).

Figure 19:
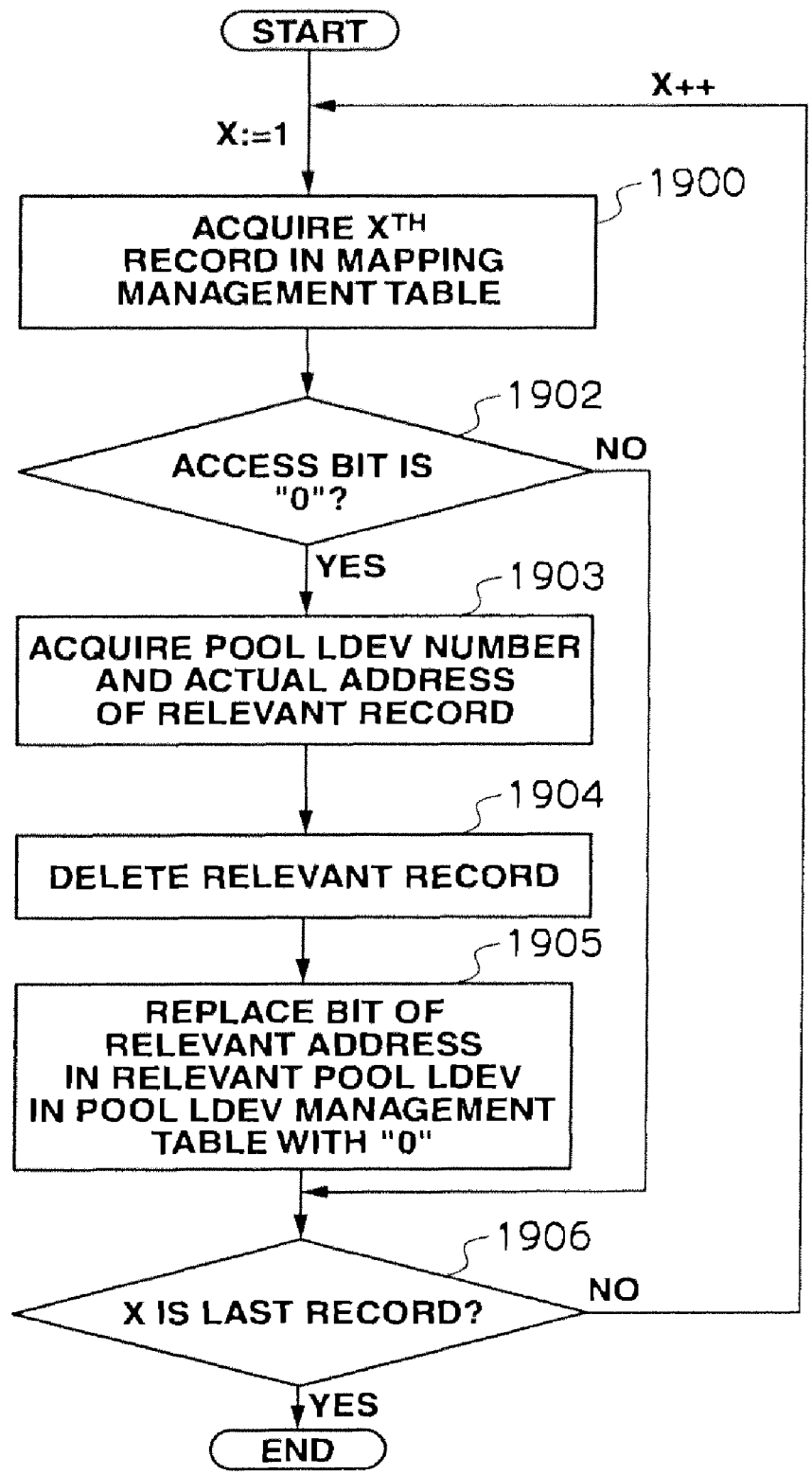
FIG. 19 is a flowchart for cancelling mapping of storage extents with the "0" access bit.

FIG. 19 is a flowchart for cancelling mapping of a storage extent with the "0" access bit. A remaining storage extent in the LDEV with the "0" access bit is a redundant extent that the host computer would not be likely to access for a while. In that case, the storage resources cannot be used efficiently. Therefore, the mapping of such extents is cancelled for the purpose of clearing redundant extents. In step 1900, the channel controller acquires the first record in the mapping management table (FIG. 8) and checks whether or not the access bit in that record is "0" (1902). If the check result is YES, the channel controller acquires the relevant pool LDEV number and actual address in that record (1903), and deletes the record (1904). Subsequently, the bit of the above acquired address in the relevant pool LDEV in the pool LDEV management table is set to "0" (1905).

The above described processing is repeated until the last record (1906). In the records in the mapping management table, one having the "0" access bit corresponds to a storage extent that has not actually been accessed by the host computer. All records in the mapping management table are periodically scanned and the mapping information is deleted based on the access bit. The access bit is the control information for determining whether or not to release a storage extent when the storage system performs the release processing.

Figure 20:
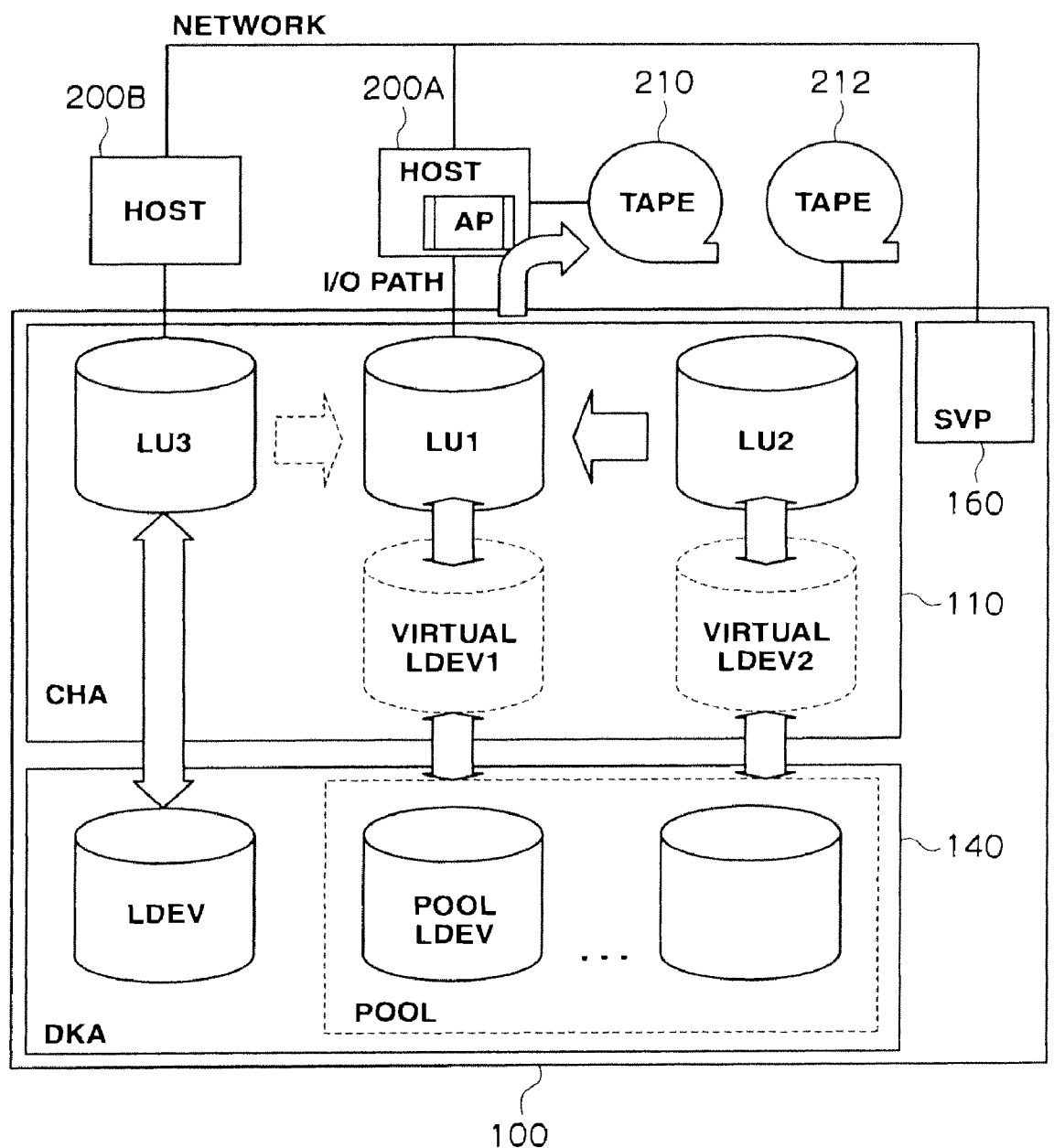
FIG. 20 is a functional block diagram showing a backup operation using copy pair volumes.

Next, the third example of mapping cancellation will be described. FIG. 20 is a block diagram illustrating this example. In this example, a storage extent is released from mapping after the storage system acquires backup of the relevant paired volumes. LU1 and LU2 are paired volumes. The copy source LU (main volume) may be mapped to a usual LDEV or virtual LDEV. The copy source LU3 is directly mapped to an LDEV having actual storage extents. The copy source LU2 is mapped to a virtual LDEV2. The storage system regularly performs copy (re-synchronization), produces a snapshot of volume content of LU2 in the copy destination (sub volume) LU1, and backs up the data from LU1 to a tape device.

A tape device 210 may be connected to the host computer 200A. Alternatively, the tape device 212 may be connected to the storage system so that the storage system controls data backup to the tape device 212 according to a SCSI extended copy command from the host computer. When the sequence of processing for the re-synchronization and backup acquisition ends, the content stored in the sub volume LU1 becomes unnecessary. Because that sub volume is mapped to the virtual LDEV, the mapping of the storage extent in the pool LDEV allocated to the virtual LDEV is cancelled to release the storage extent. The sequence of processing for the above described re-synchronization, backup acquisition, and extent release is performed by a backup application AP that operates on a host computer. Therefore, an extent release order is transmitted from the application to the storage subsystem via an I/O path or network.

Figure 21:
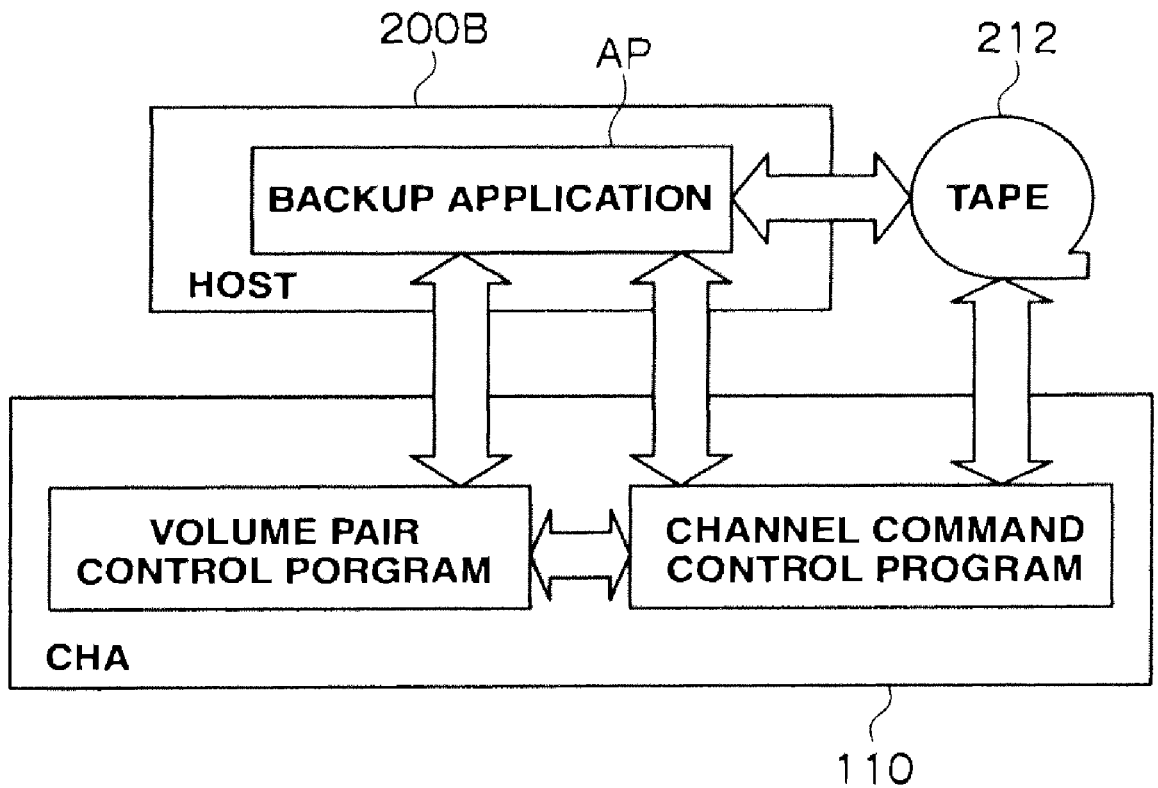
FIG. 21 is a functional block diagram showing the operational relationship between a backup application and a channel controller.

As shown in FIG. 21, the backup application issues a command to the channel command control program and volume pair control program to take a snapshot of an LU and copy the backup data to the tape device 212. The command to the volume pair control program may be issued from a control terminal via the network, or via a channel I/F. The tape device may be controlled by the backup application itself, or the backup application may, by issuing a command, order the channel command control program to control the tape device.

Figure 22:
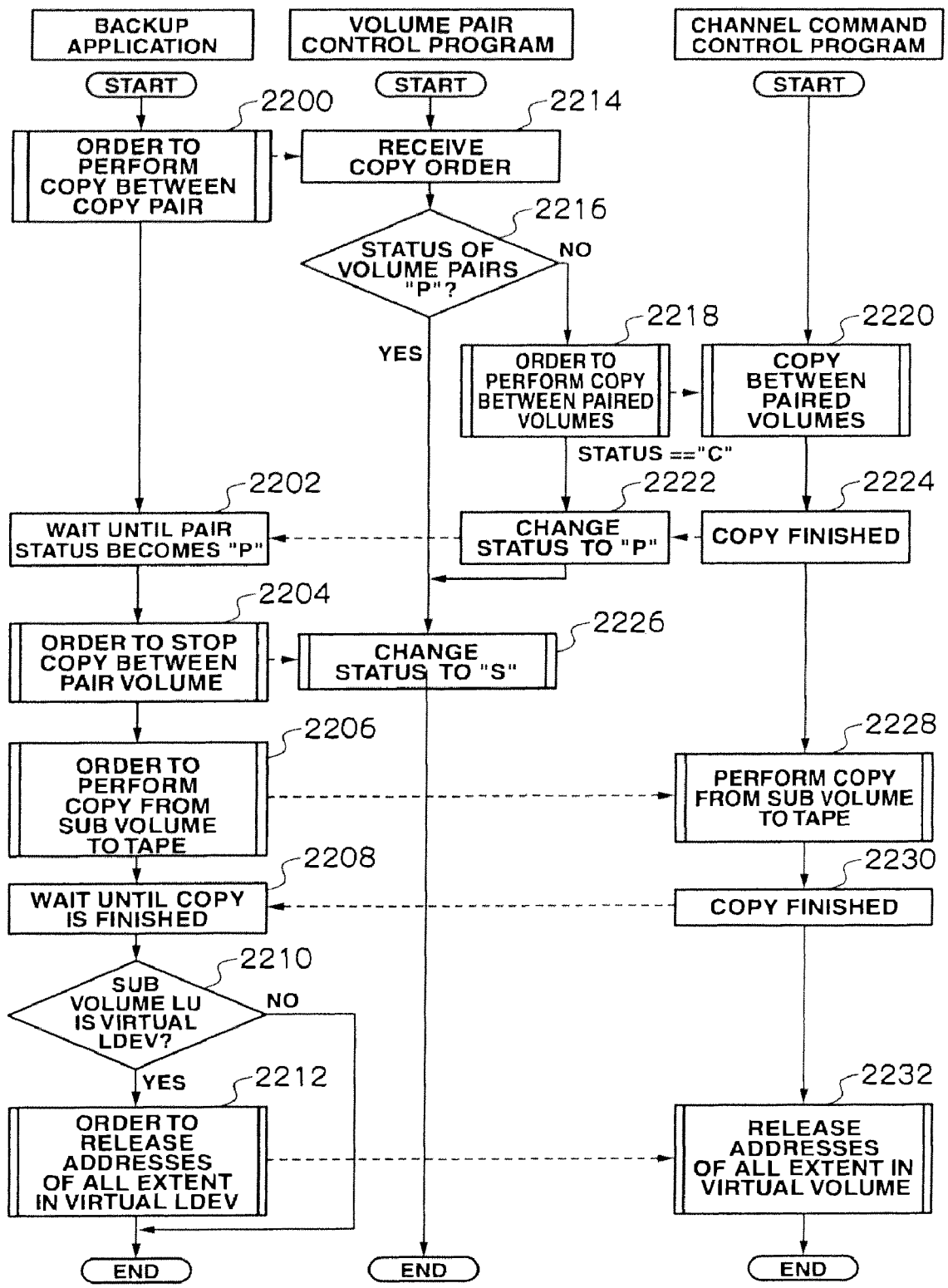
FIG. 22 is a flowchart showing a backup operation.

FIG. 22 shows flowcharts showing an operation for releasing a storage extent after backup of paired volumes is acquired in the tape device. The backup application in the host computer orders the volume pair control program to perform copy between the paired volumes (2200, 2214). The volume pair control program checks the status of the volume pair (2216). If the status is "P" in step 2216, the volume pair control program does nothing and waits for an order from the backup application. If the status is not "P" in step 2216, the volume pair control program orders the channel command control program to execute copy between the paired volumes (2218). At this point in time, the status shifts to "C." The volume pair control program changes the status to "P" when the copy executed by the channel command control program ends.

The backup application waits until the pair status becomes "P" (2202), and orders the copy between the paired volumes stopped (2204). The volume pair control program changes the status to "S" in response to copy suspension between the paired volumes (2226). The backup application gives the order for copy from the sub volume to the tape (2206). The channel command control program, receiving that order, executes copy from the sub volume to the tape (2228). The backup application waits until the copy is finished (2208), and determines whether or not the LU accessed by the sub volume is the virtual LDEV. If the result is YES, the backup application orders the channel command control program to cancel the mapping of addresses of all extents in the virtual LDEV.

The channel command control program releases, from the mapping, the extents in the pool LDEV that are mapped to the addresses of all extents in the virtual LDEV when the copy is finished and the release ordered (2232). By executing the above described processing, storage extents in the virtual volume linked to the sub volume are released from mapping when the copy between the paired volumes is finished.

Figure 23:
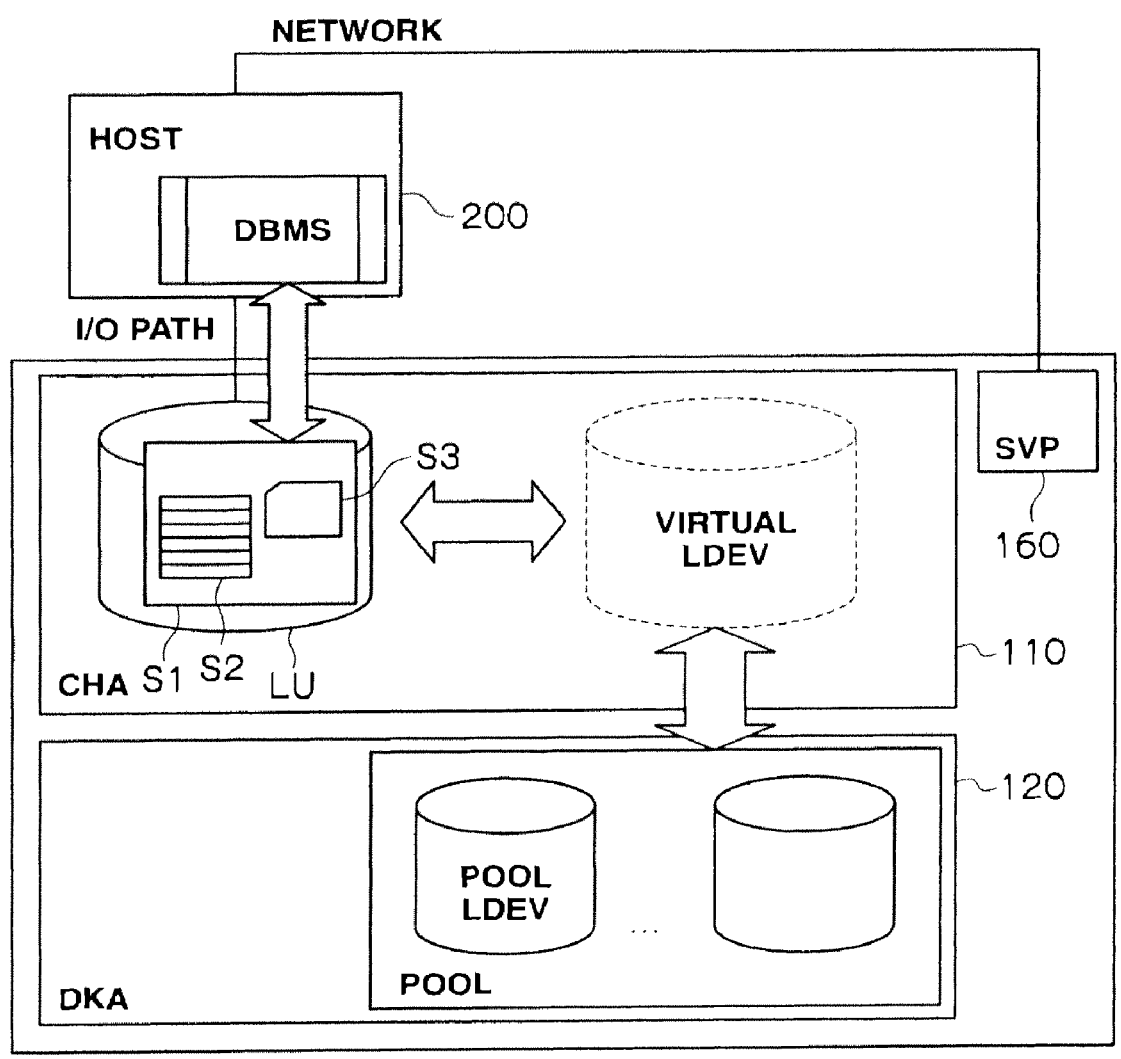
FIG. 23 is a functional block diagram showing a storage system and a working of an application program relating to a data base management system (DBMS).

Next, another embodiment of storage extent release will be described with reference to FIG. 23. In this embodiment, the mapping of a storage extent is deleted by an application that operates on the host computer 200. As an example of application software, a DBMS (Database Management System) is used here. The DBMS reads and writes data such as a table space, index, and log, etc. from/to a storage extent in an LU. The above data occupies an area (segment) of a certain size, and that occupied segment has its logical structure inside. A segment is divided up into further smaller blocks (data blocks). During operation, the DBMS records, updates, or deletes data according to the logical structure of the segment in the LU. Therefore, the DBMS has a table for managing information about whether or not the data blocks S2 in the segment S1 are in use, and that table is referred to as "free list S3." If an LU including data blocks is linked to a virtual LDEV, mapping is established when the host computer (DBMS) accesses the LU. Although a unit of the data block size is equivalent to that of the mapped extent size in this example, the relationship between those sizes is not limited to that situation.

Figures 24, 25:
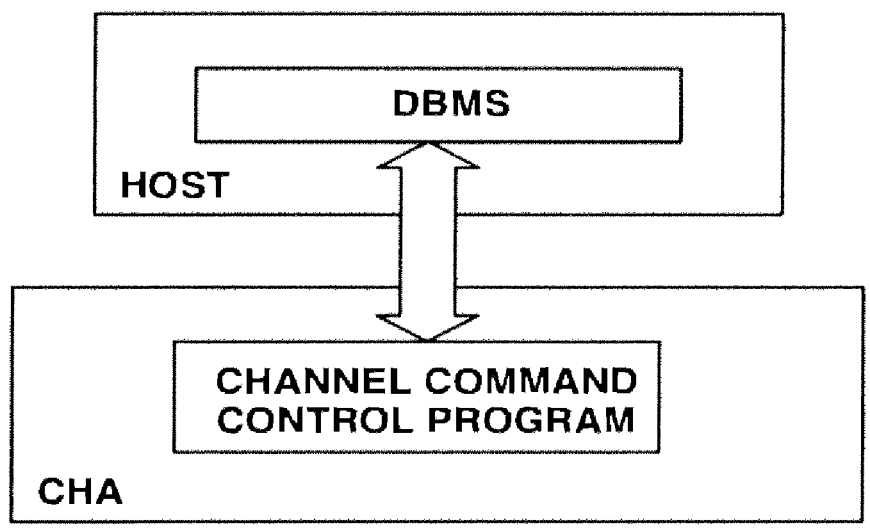
FIG. 24 is a block diagram showing the relationship between a DBMS and a channel command control program.
FIG. 25 is a table showing a free list.

FIG. 24 is a block diagram showing the relationship between the DBMS and the channel command control program. The DBMS issues a command to the channel command control program and accesses an LU. The host computer orders the channel controller to delete mapping of a storage extent and release the storage extent. That order command may be issued from a service processor (SVP) via a network, or via a channel I/F. FIG. 25 is a table showing a free list. The free list for each segment exists. The "1" usage bit means "in use," and the "0" usage bit means "not in use" for each data block specified by the data block number.

Figure 26:
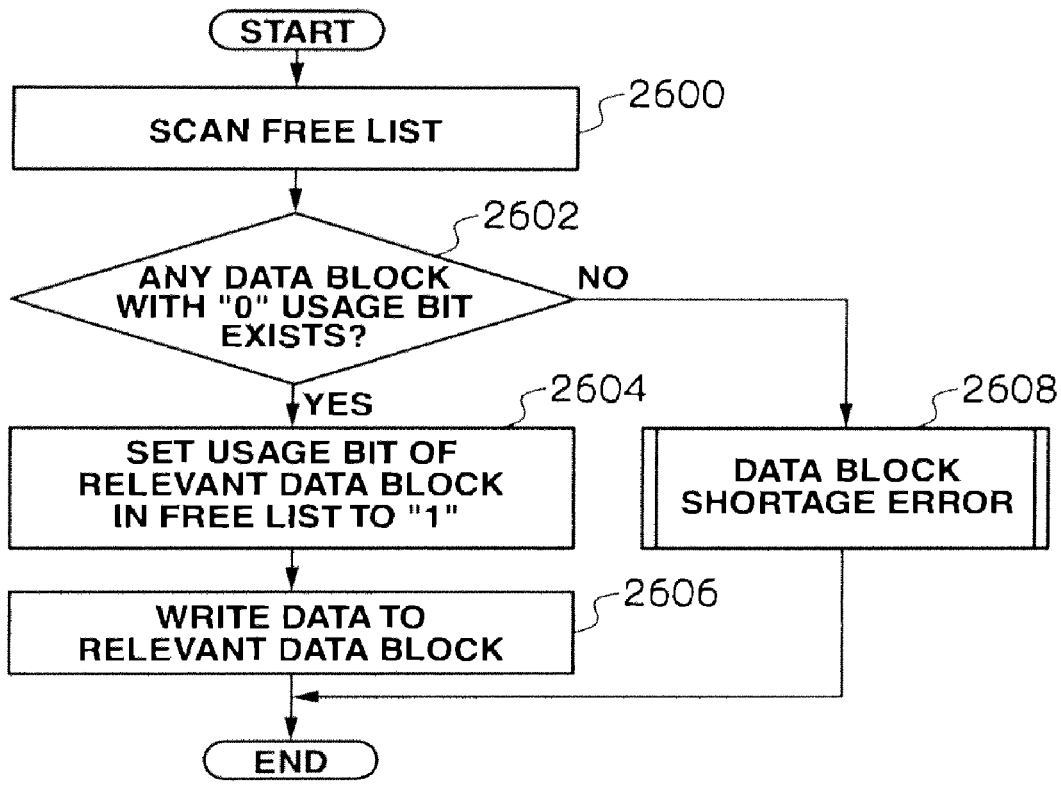
FIG. 26 is a flowchart for recording data in a DBMS.

FIG. 26 is a flowchart for recording data in the DBMS. In FIG. 26, the DBMS scans the free list (2600), and checks whether or not any data block with the "0" data bit exists (2602). If the check result is YES, the channel controller sets the usage bit of that data block in the free list to "1" (2604). Subsequently, the channel controller writes data to the relevant data block (2606). If the check result in step 2602 is NO, the channel controller performs data block shortage error processing (2608).

Figure 27:
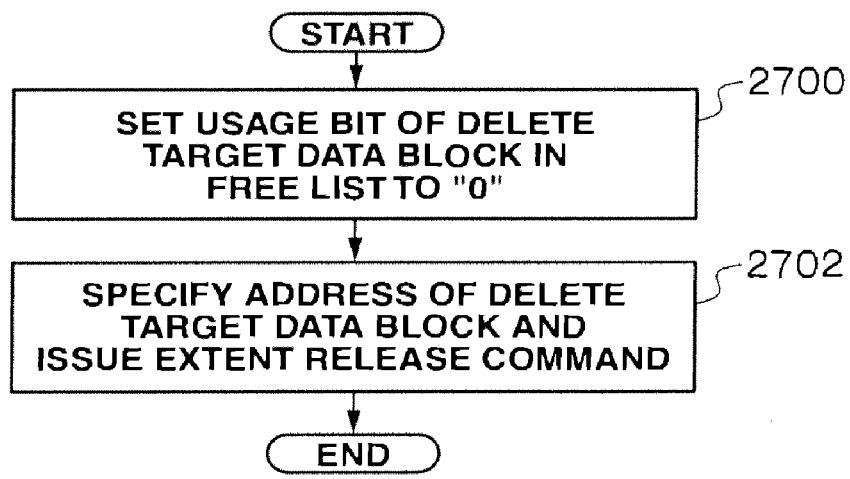
FIG. 27 is a flowchart for deleting data in a DBMS.

FIG. 27 is a flowchart for deleting data in the DBMS. The DBMS sets the usage bit of a delete target data block in the free list to "0" (2700), specifies the delete target data block address, and issues an extent release command.

Figure 28:
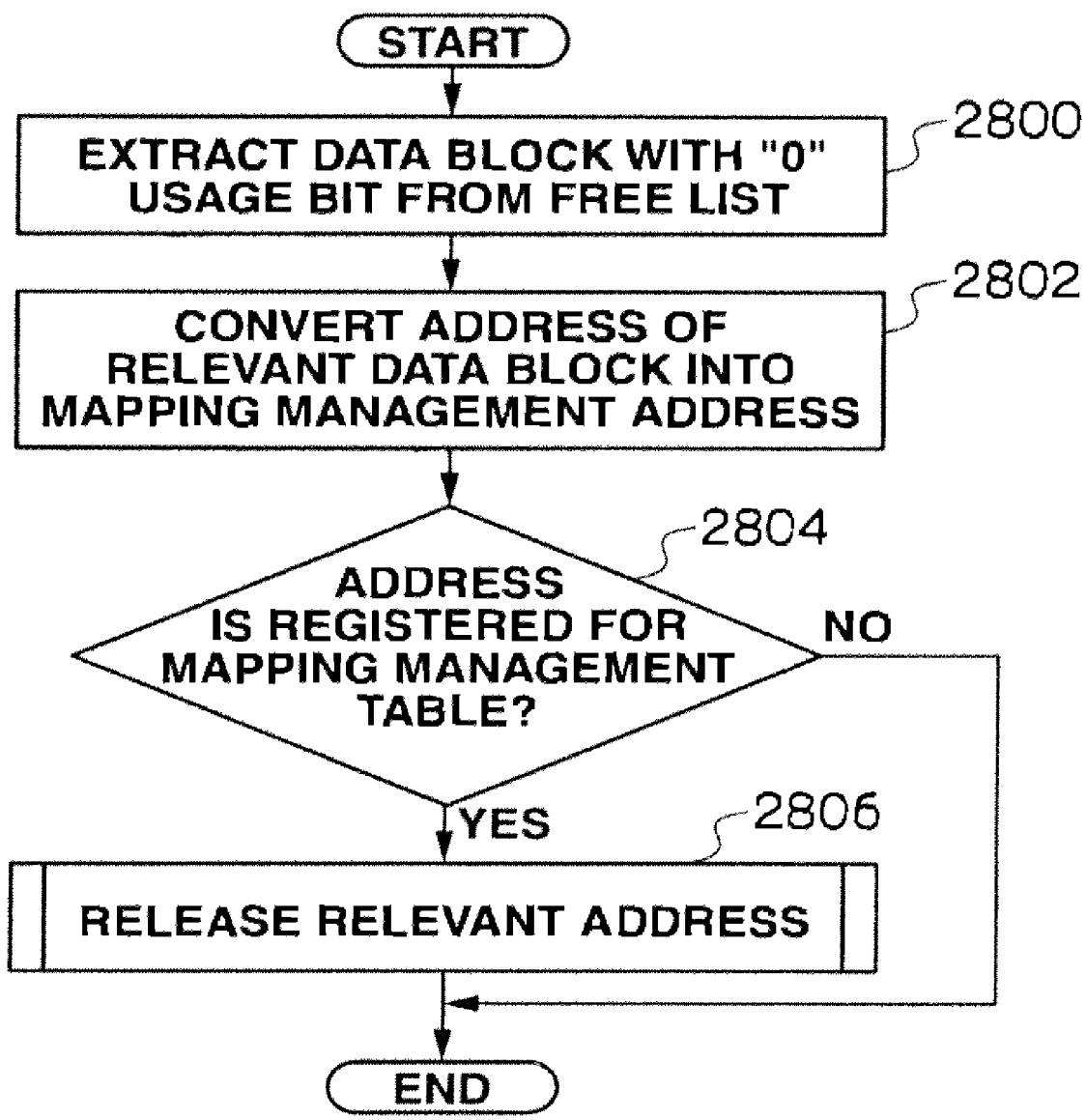
FIG. 28 is a flowchart for a channel controller executing storage extent release with reference to a free list.

FIG. 28 is a flowchart for the channel controller referring to the free list and releasing a storage extent. The channel controller extracts a data block with the "0" usage bit from the free list (2800), and converts the address of that data block into an address in the virtual volume for mapping management (2802). Subsequently, the channel controller checks whether or not the above converted address is registered for the mapping management table shown in FIG. 8 (2804). If the check result is YES, the channel controller releases the storage extent in the pool LDEV corresponding to that address (2806). The channel command control program periodically performs the processing in FIG. 28.

Figure 29:
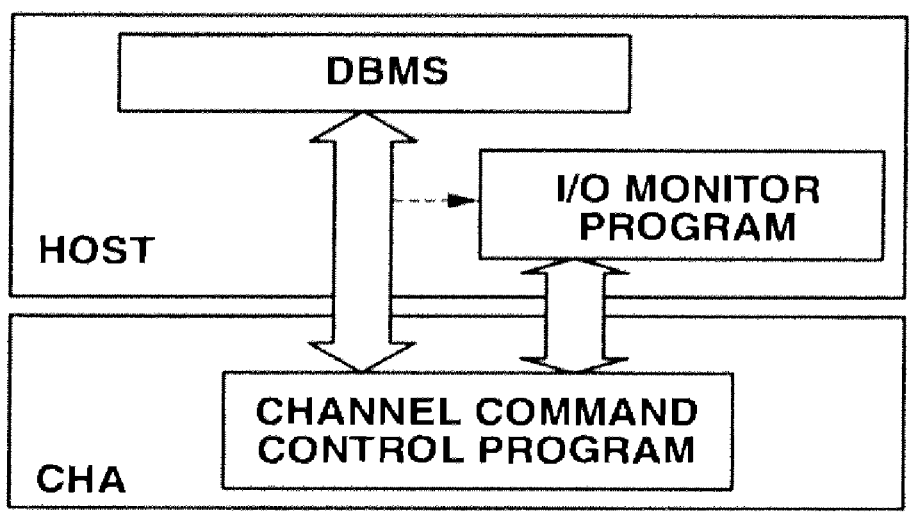
FIG. 29 is a block diagram relating to program content for releasing storage extents with a program for monitoring I/O from a host computer to a channel controller.
Figure 30:
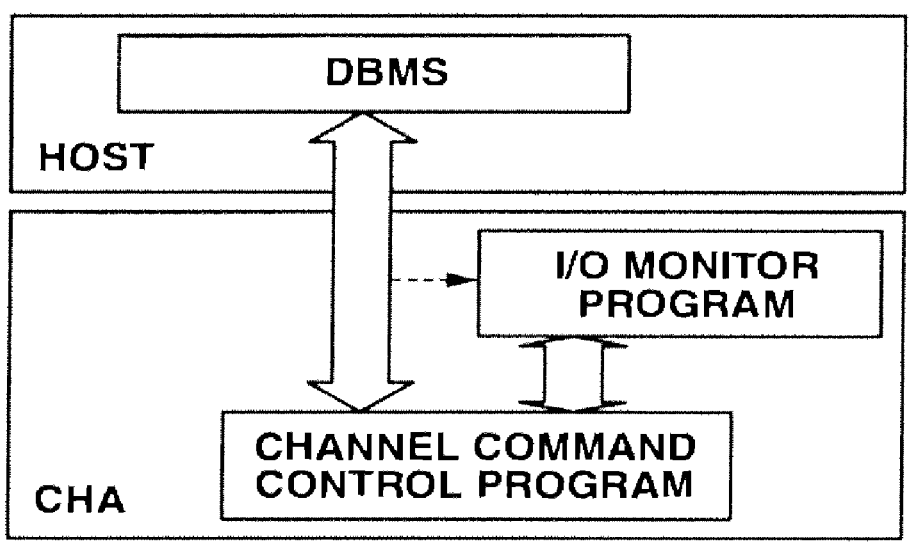
FIG. 30 is a modified example of FIG. 29.

FIG. 29 is a block diagram relating to a modified example of FIG. 28, showing a program operation for releasing a storage extent with a program for monitoring I/O from the host computer to the channel controller. The I/O monitor program in the host computer monitors access commands issued from the DBMS. If the I/O monitor program detects an access for setting the usage bit of a record in the free list to "0," the program orders the channel command control program to delete mapping of the address specified in the record and release a storage extent at that address. The order command may be issued from an SVP via a network, or via a channel I/F. As shown in FIG. 30, the I/O monitor program may be installed in the channel controller.

Figure 31:
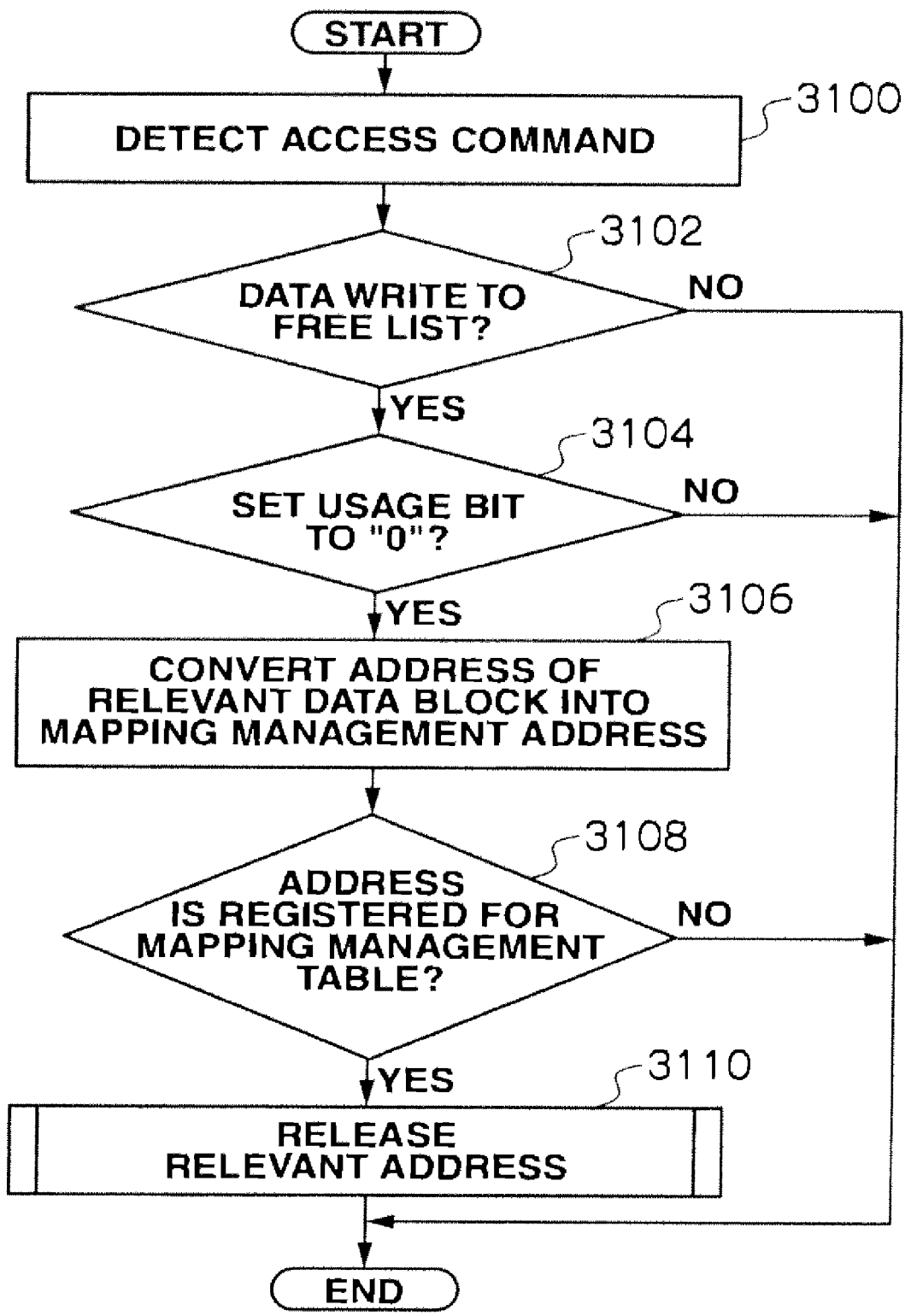
FIG. 31 is a flowchart showing a system operation relating to FIG. 29.

FIG. 31 is a flowchart illustrating the operation in FIG. 29. The I/O monitor program detects an access command from the host computer (3100), and checks whether or not the access command specifies data write to the free list (3102). If the check result is YES, the I/O monitor program checks whether or not the command specifies setting the usage bit of a data block to "0" (3104). If the check result is YES, the address of the data block with the relevant usage bit is converted into an address for mapping management (3106). Subsequently, the I/O monitor program checks whether or not the above converted address is registered for the mapping management table, and releases a storage extent corresponding to the address if the check result if YES.

Figure 32:
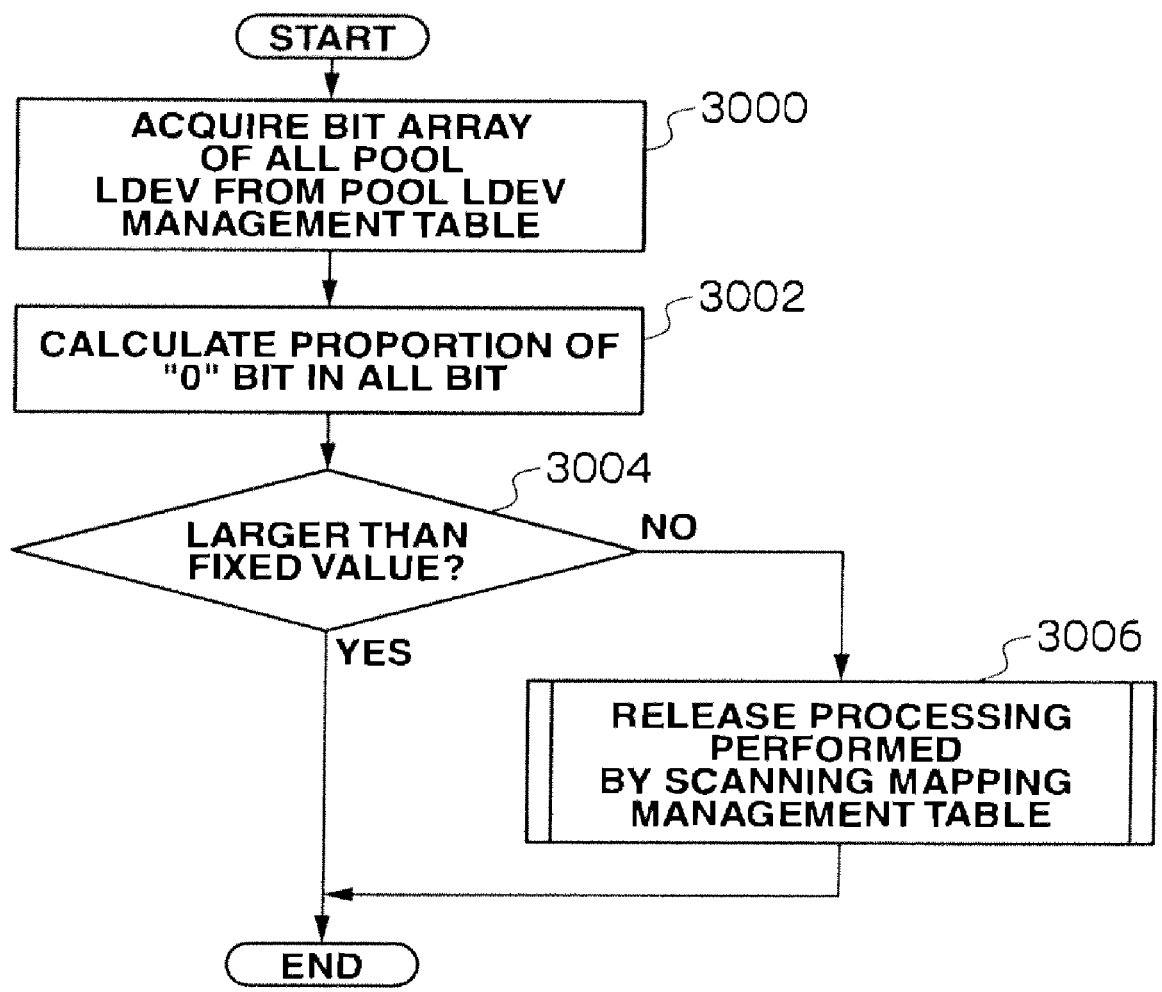
FIG. 32 is a flowchart for executing a release processing based on bit arrays shown in a pool LDEV management table.

In the above described all of the methods for storage extent release processing, instead of promptly executing the release processing, the processing shown in FIG. 19 may be executed after the lapse of a certain period of time after setting the access bit of an actual address that is to be released in the mapping management table to "0." By doing so, the release processing can be delayed. Alternatively, the release processing may be performed according to the flowchart shown in FIG. 32. In other words, the channel controller acquires bit arrays of all pool LDEVs from the pool LDEV management table (3000). Next, the channel controller calculates the proportion of the "0" bits in all bits (3002), and determines whether or not the proportion is larger than a certain value (3004). If the check result is NO, the channel controller, determining that storage extents are insufficient, scans the mapping management table and performs the release operation according to the processing in FIG. 19 (3006).

Figure 33:
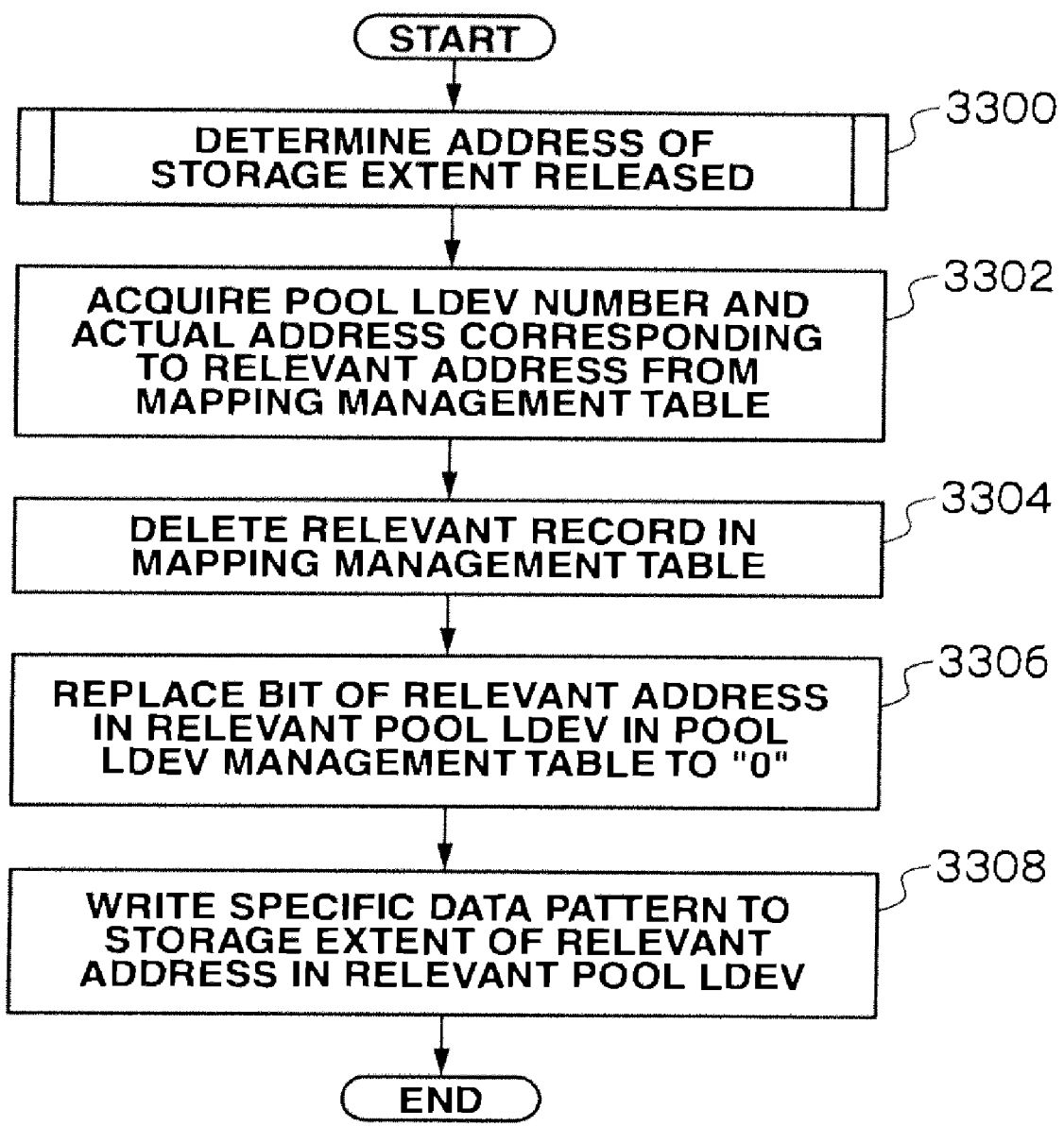
FIG. 33 is a flowchart for erasing data stored in a released storage extent.

FIG. 33 is a flowchart showing processing for erasing data in a storage extent that is to be released. The channel controller determines the address of a storage extent released (3300). Next, the channel controller acquires the pool LDEV number and actual address relevant to that address from the mapping management table (3302), and deletes the relevant record in the mapping management table (3304). The channel controller replaces the bit of the address in the pool LDEV in the pool LDEV management table with "0" (3306), and writes a specific data pattern to the storage extent of the relevant address in the pool LDEV (3308).

Examples of the specific data pattern include setting all bits to "0," rendering a random bit pattern, and repeating such patterns several times. By deleting data as described above, the data that was originally recorded in the released storage extent is prevented from being read by other host computers or applications when another mapping is established afterward on that storage extent, thereby reducing security risks.

External storage resources in another storage system may also be used as a pool LDEV. In that case, storage resources in a second storage system are allocated to a virtual volume in a first storage system. A host computer can access the storage resources in the second storage system by accessing the virtual volume in the first storage system.

Figure 34:
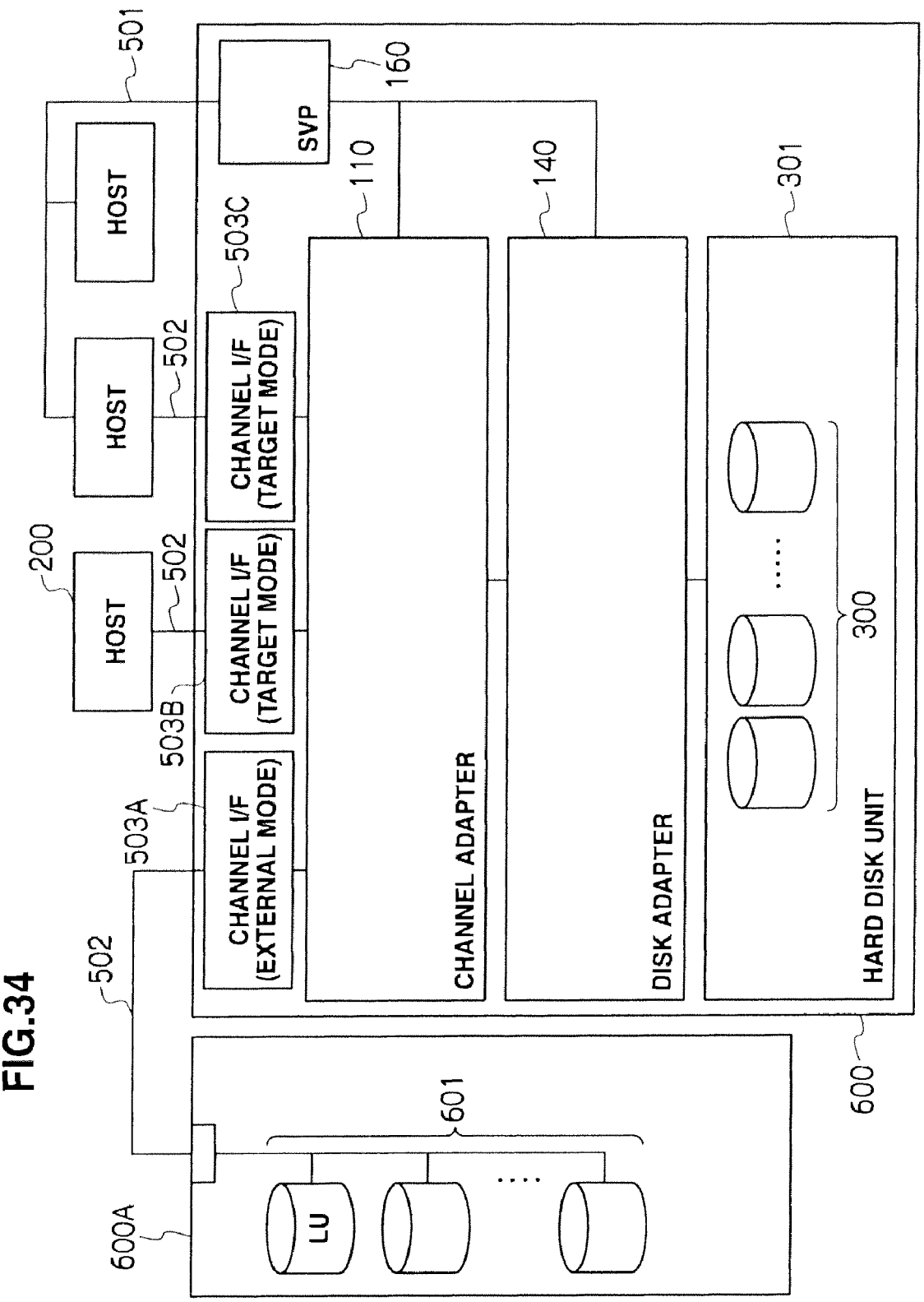
FIG. 34 is a block diagram illustrating a system in which a storage system is connected to another external storage system.

FIG. 34 illustrates the state where a storage system 600 is connected externally to another storage system 600A. Compare FIG. 34 with FIG. 2. In FIG. 34, reference numeral 501 represents a network, reference numeral 502 represents an I/O path, reference numeral 503A represents a channel I/F (external mode), reference numerals 503B and 503C represent channel I/Fs (target mode), reference numeral 301 represents a hard disk unit, and reference numeral 601 represents external LUs in an external storage subsystem.

The channel I/F (target mode) is an interface for an access from the host computer to the storage subsystem. The channel I/F (external mode) is an interface for an access from the storage subsystem to the external storage subsystem. The external LUs mean a group of volumes (LUs) defined in the external storage subsystem.

Figure 35:
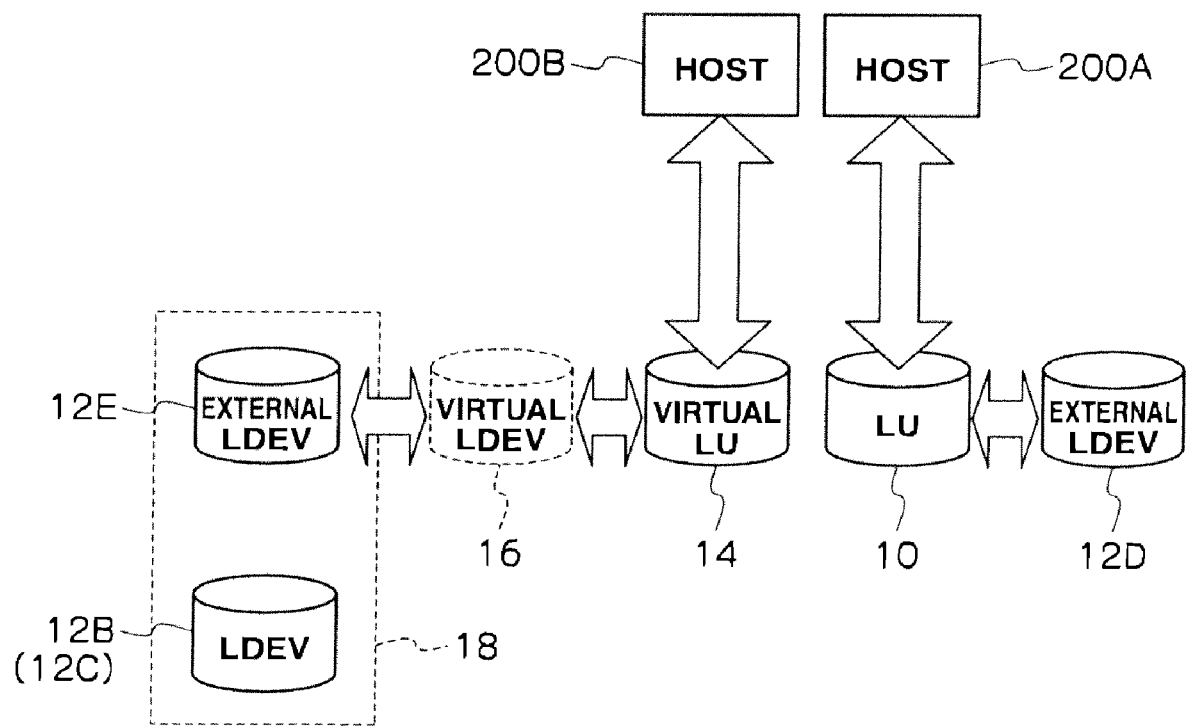
FIG. 35 is a block diagram showing the correspondence relationship between volumes in the storage systems in the system shown in FIG. 34.

FIG. 35 is a block diagram showing the state where the host computer recognizes the external LU as a volume in the storage system 600 via a virtual volume in the storage system 600. Reference numeral 12D represents an external LDEV defined in the external storage system 600A. The external LDEV 12D is allocated to an LU 10. Reference numeral 12E represents an external LDEV included in a pool 18, like an LDEV 12B (12C) in the storage system 600. A virtual LDEV 16 in the storage system 600 uses the pool 18 for establishing mapping.

The external LDEV is an LU in the external storage subsystem recognized by the channel command control program via the channel I/F in the external mode, that is virtually set as a storage extent equivalent to an LDEV. The external LDEV can be mapped to an LU, accessed by a host computer, and included in the pool and used for mapping to the virtual LDEV, like a usual LDEV (provided by the RAID control program). A pool may include only the usual LDEVs, or only the external LDEVs, or may include both of them. The external LDEV is used in the same way as the usual LDEV in the LDEV list table (shown in FIG. 6).

We claim:

1. A storage system having a plurality of storage devices and a controller that controls data input and output to/from the plurality of storage devices in response to an access request from an application mounted on a host computer being coupled to the storage system via a communication path, the storage system comprising:
   a pool having a plurality of pool volumes each including a plurality of storage extents in the storage devices, and
   a virtual volume accessed by the application of the host computer and including a plurality of virtual extents, at least one of the plurality of storage extents being allocated to at least one of the plurality of virtual extents, and at least one storage extent of the plurality of storage extents not being allocated to at least one of the plurality of virtual extents,
   wherein in response to a write access request from the application, to a first virtual extent of the virtual volume, the controller is configured to allocate a first storage extent of the plurality of storage extents to the first virtual extent of the plurality of the virtual extents if no storage extent in the storage device has been allocated to the first virtual extent, and the controller is configured to write data related to the write access to the first storage extent,
   wherein in response to a release request, which specifies a first address of at least one virtual extent in the virtual volume, issued by the host computer, the controller is configured to release the at least one storage extent allocated to the at least one virtual extent specified by the first address from the allocation and to write a specified data pattern in the released at least one storage extent.

2. The storage system according to claim 1, wherein the specified data pattern is zero data or random data.

3. The storage system according to claim 1, wherein the host computer is configured for monitoring the access request from the application to the virtual volume and for issuing the release request to the address of the virtual extent to which the application does not access based on the monitoring.

4. The storage system according to claim 1, wherein the pool further comprises at least one external volume which includes a plurality of storage extents in the storage devices in another storage system.

5. The storage system according to claim 1, wherein in response to a release request, which specifies a first address of at least one virtual extent in the virtual volume, issued by the host computer, the controller is configured for releasing the at least one storage extent allocated to the at least one virtual extent specified by the first address from the allocation and for writing the specified data pattern in the released at least one storage extent after predetermined period has passed.

6. The storage system according to claim 1, wherein in response to a release request, which specifies a first address of at least one virtual extent in the virtual volume, issued by the host computer, the controller is configured for releasing the at least one storage extent allocated to the at least one virtual extent specified by the first address from the allocation and for writing the specified data pattern in the released at least one storage extent when the ratio of storage extents have not been allocated to the virtual volume become less than predetermined value.

7. A data transfer method for a storage system having a plurality of storage devices and a controller that controls data input and output to/from the plurality of storage devices in response to an access request from an application mounted on a host computer being coupled to the storage system via a communication path, the method comprising:
   accessing, by the application of the host computer, a virtual volume, wherein the virtual volume includes a plurality of virtual extents, at least one of a plurality of storage extents being allocated to at least one of the plurality of virtual extents, and wherein at least one storage extent of the plurality of storage extents not being allocated to at least one of the plurality of virtual extents;
   allocating, by the controller in response to a write access request from the application, to a first virtual extent of the virtual volume, a first storage extent of the plurality of storage extents to the first virtual extent of the plurality of the virtual extents if no storage extent in the storage device has been allocated to the first virtual extent, and writing, by the controller, data related to the write access to the first storage extent; and releasing, in response to a release request, which specifies a first address of at least one virtual extent in the virtual volume, issued by the host computer, the at least one storage extent allocated to the at least one virtual extent specified by the first address from the allocation and writing specified data pattern in the released at least one storage extent.

8. The storage system according to claim 7, wherein the specified data pattern is zero data or random data.

9. The method according to claim 7, further comprising:
monitoring, using the host computer, the access request from the application to the virtual volume; and
issuing the release request to the address of the virtual extent to which the application does not access based on the monitoring.

10. The method according to claim 7, further comprising accessing at least one external volume which includes a plurality of storage extents in storage devices in another storage system.

11. The storage system according to claim 7, further comprising releasing, in response to a release request, which specifies a first address of at least one virtual extent in the virtual volume, issued by the host computer, the at least one storage extent allocated to the at least one virtual extent specified by the first address from the allocation and writing the specified data pattern in the released at least one storage extent after predetermined period has passed.

12. The method of claim 7, further comprising releasing, in response to a release request, which specifies a first address of at least one virtual extent in the virtual volume, issued by the host computer, the at least one storage extent allocated to the at least one virtual extent specified by the first address from the allocation and writing the specified data pattern in the released at least one storage extent when the ratio of storage extents have not been allocated to the virtual volume become less than predetermined value.

13. A computer-readable storage medium storing a software program, the software program for transferring data in a storage system having a plurality of storage devices and a controller that controls data input and output to/from the plurality of storage devices in response to an access request from an application mounted on a host computer being coupled to the storage system via a communication path, the program, when executed by a computer, performing a process, comprising:

accessing, by the application of the host computer, a virtual volume, wherein the virtual volume includes a plurality of virtual extents, at least one of a plurality of storage extents being allocated to at least one of the plurality of virtual extents, and wherein at least one storage extent of the plurality of storage extents not being allocated to at least one of the plurality of virtual extents;

allocating, by the controller in response to a write access request from the application, to a first virtual extent of the virtual volume, a first storage extent of the plurality of storage extents to the first virtual extent of the plurality of the virtual extents if no storage extent in the storage device has been allocated to the first virtual extent, and writing, by the controller, data related to the write access to the first storage extent; and releasing, in response to a release request, which specifies a first address of at least one virtual extent in the virtual volume, issued by the host computer, the at least one storage extent allocated to the at least one virtual extent specified by the first address from the allocation and writing specified data pattern in the released at least one storage extent.

14. The computer-readable storage medium according to claim 13, wherein the specified data pattern is zero data or random data.

15. The computer-readable storage medium according to claim 13, wherein the process further comprises:
monitoring, using the host computer, the access request from the application to the virtual volume; and
issuing the release request to the address of the virtual extent to which the application does not access based on the monitoring.

16. The computer-readable storage medium according to claim 13, wherein the process further comprises accessing at least one external volume which includes a plurality of storage extents in storage devices in another storage system.

17. The computer-readable storage medium according to claim 13, wherein the process further comprises releasing, in response to a release request, which specifies a first address of at least one virtual extent in the virtual volume, issued by the host computer, the at least one storage extent allocated to the at least one virtual extent specified by the first address from the allocation and writing the specified data pattern in the released at least one storage extent after predetermined period has passed.

18. The computer-readable medium of claim 13, wherein the process further comprises releasing, in response to a release request, which specifies a first address of at least one virtual extent in the virtual volume, issued by the host computer, the at least one storage extent allocated to the at least one virtual extent specified by the first address from the allocation and writing the specified data pattern in the released at least one storage extent when the ratio of storage extents have not been allocated to the virtual volume become less than predetermined value.

* * * * *